United States Patent
Chiang et al.

(10) Patent No.: US 11,327,573 B2
(45) Date of Patent: May 10, 2022

(54) KEYBOARD AND KEYSWITCH AND ADJUSTMENT MECHANISM THEREOF

(71) Applicant: Darfon Electronics Corp., Taoyuan (TW)

(72) Inventors: Chih-Hsiang Chiang, Taoyuan (TW); Chen Yang, Taoyuan (TW); Yu-Chun Hsieh, Taoyuan (TW); Po-Yueh Chou, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 17/308,245

(22) Filed: May 5, 2021

(65) Prior Publication Data

US 2021/0357037 A1 Nov. 18, 2021

(30) Foreign Application Priority Data

May 15, 2020 (TW) .................................. 109116307

(51) Int. Cl.
| | |
|---|---|
| *G06F 3/02* | (2006.01) |
| *H01H 13/7073* | (2006.01) |
| *H01H 13/7065* | (2006.01) |
| *G06F 3/01* | (2006.01) |

(52) U.S. Cl.
CPC ............ *G06F 3/0202* (2013.01); *G06F 3/016* (2013.01); *H01H 13/7065* (2013.01)

(58) Field of Classification Search
None
See application file for complete search history.

(56) References Cited

U.S. PATENT DOCUMENTS

| | | | |
|---|---|---|---|
| 4,447,681 | A | 5/1984 | Desmarais |
| 4,939,327 | A | 7/1990 | Wu et al. |
| 5,015,811 | A | 5/1991 | Moriyama |
| 6,172,868 | B1 | 1/2001 | Oura |
| 6,236,339 | B1 | 5/2001 | Kamizono |

(Continued)

FOREIGN PATENT DOCUMENTS

| | | |
|---|---|---|
| CN | 201047939 Y | 4/2008 |
| CN | 203812764 U | 9/2014 |

(Continued)

*Primary Examiner* — Carl Adams
(74) *Attorney, Agent, or Firm* — McClure, Qualey & Rodack, LLP

(57) ABSTRACT

A keyboard includes a cover plate having a plurality of first keyholes, an adjustment mechanism disposed under the cover plate, and a plurality of keyswitches. The adjustment mechanism includes an adjustment frame and a plurality of adjustment portions. The adjustment frame includes a plurality of ribs defining a plurality of second keyholes corresponding to the plurality of first keyholes, respectively. Each of the adjustment portions is proximate to a corresponding one of the second keyholes. Each of the keyswitches includes a tactile feedback member and is located in corresponding first and second keyholes, so that the adjustment portion corresponds to the tactile feedback member of its corresponding keyswitch. The adjustment frame is movable relative to the cover plate, so that each of the adjustment portions drives a portion of the tactile feedback member to move, to change tactile feedback of the keyswitches.

23 Claims, 31 Drawing Sheets

(56) References Cited

U.S. PATENT DOCUMENTS

| | | | |
|---|---|---|---|
| 10,079,601 | B2 | 9/2018 | Liu |
| 10,128,063 | B2 | 11/2018 | Liao et al. |
| 10,310,609 | B2 | 6/2019 | Liu |
| 2015/0206672 | A1* | 7/2015 | Hsu ..................... G06F 3/0202 307/115 |
| 2017/0213663 | A1 | 7/2017 | Jhuang |
| 2018/0006648 | A1 | 1/2018 | Liu |
| 2018/0069550 | A1 | 3/2018 | Lehmann et al. |
| 2019/0164703 | A1 | 5/2019 | Yang et al. |
| 2019/0172661 | A1 | 6/2019 | Hsieh et al. |
| 2019/0393003 | A1* | 12/2019 | Wang ..................... H01H 13/52 |
| 2019/0393004 | A1* | 12/2019 | Wang ..................... H01H 13/85 |
| 2020/0150777 | A1* | 5/2020 | Lin ................... H01H 13/7073 |

FOREIGN PATENT DOCUMENTS

| | | |
|---|---|---|
| CN | 104867771 A | 8/2015 |
| CN | 104882316 A | 9/2015 |
| CN | 105206456 A | 12/2015 |
| CN | 105206457 A | 12/2015 |
| CN | 205542520 U | 8/2016 |
| CN | 106024467 A | 10/2016 |
| CN | 106024474 A | 10/2016 |
| CN | 106057535 A | 10/2016 |
| CN | 205789638 U | 12/2016 |
| CN | 205920908 U | 2/2017 |
| CN | 106531520 A | 3/2017 |
| CN | 106683930 A | 5/2017 |
| CN | 206379297 U | 8/2017 |
| CN | 206774427 U | 12/2017 |
| CN | 207068731 U | 3/2018 |
| CN | 108010775 A | 5/2018 |
| CN | 108091514 A | 5/2018 |
| CN | 108269710 A | 7/2018 |
| CN | 108346539 A | 7/2018 |
| CN | 207868107 U | 9/2018 |
| CN | 108922810 A | 11/2018 |
| CN | 110277267 A | 9/2019 |
| JP | H0428123 A | 1/1992 |
| JP | H11265252 A | 9/1999 |
| TW | 195991 | 12/1992 |
| TW | 201705173 A | 2/2017 |
| TW | I581290 B | 5/2017 |
| TW | 201727685 A | 8/2017 |
| TW | I607476 B | 12/2017 |
| TW | I632576 B | 8/2018 |
| TW | I667676 B | 8/2019 |

\* cited by examiner

KEYBOARD AND KEYSWITCH AND ADJUSTMENT MECHANISM THEREOF

BACKGROUND OF THE INVENTION

1. Field of the Invention

The invention generally relates to a keyboard, and a keyswitch and an adjustment mechanism thereof. Particularly, the invention relates to a keyboard with adjustable tactile feedback, and a keyswitch and an adjustment mechanism thereof.

2. Description of the Prior Art

Keyswitches in a conventional keyboard generally provide only one kind of tactile feedback. Users have to select the keyboard with appropriate tactile feedback among keyboards with different kinds of tactile feedback according to personal pressing habits. However, when the user is in different operation situations, such as typing, gaming, it is generally desirable to have different tactile feedbacks, so that keyboards that provide merely a single type of tactile feedback cannot satisfy the user's needs, and the user has to purchase additional keyboards with different tactile feedbacks, resulting in extra cost and storage concerns for keyboards not in use.

SUMMARY OF THE INVENTION

It is an object of the invention to provide a keyboard and a keyswitch and an adjustment mechanism thereof, which can provide multiple kinds of tactile feedback for users to choose, so as to satisfy users' needs.

It is another object of the invention to provide a keyboard and a keyswitch and an adjustment mechanism thereof, which can integrate the adjustment mechanism to achieve a minimized thickness, so as to facilitate the thinning effect of keyboard.

In an embodiment, the invention provides a keyboard including a cover plate, an adjustment mechanism, and a plurality of keyswitches. The cover plate has a plurality of first keyholes. The adjustment mechanism is disposed under the cover plate, and the adjustment mechanism includes an adjustment frame and a plurality of adjustment portions. The adjustment frame includes a plurality of ribs defining a plurality of second keyholes respectively corresponding to the plurality of first keyholes. Each of the adjustment portions is proximate to a corresponding one of the second keyholes. Each of the keyswitches includes a tactile feedback member and is located in corresponding first and second keyholes, so that the adjustment portion corresponds to the tactile feedback member of its corresponding keyswitch. The adjustment frame is movable relative to the cover plate, so that each of the adjustment portions drives a portion of the tactile feedback member to move, and tactile feedback of each of the keyswitches is changed.

In an embodiment, the keyswitch includes a keycap and a restoring mechanism. The restoring mechanism is disposed below the keycap and configured to provide a restoring force to enable the keycap to return to a non-pressed position after the keycap is released from being pressed. The restoring mechanism includes a casing and a restoring member. The restoring member and the tactile feedback member are disposed in the casing. An upper portion of the casing protrudes from the first keyhole, and a lower portion of the casing is at least partially located within the second keyhole.

In an embodiment, the keyswitch further includes a resilient member and a switch layer. The resilient member is disposed below the casing, and the switch layer is disposed below the resilient member. When the keycap is pressed, the resilient member is deformed to trigger the switch layer to generate a triggering signal.

In an embodiment, the keyboard further includes a baseplate disposed below the adjustment mechanism, and the adjustment frame is movably positioned on the cover plate or the baseplate.

In an embodiment, the keyboard further includes a positioning block disposed between the cover plate and the adjustment frame, or between the baseplate and the adjustment frame. The adjustment frame has a positioning hole, and the positioning block is movably positioned in the positioning hole.

In an embodiment, the casing includes a lower casing, an upper casing, and a plunger. The lower casing is supported by the cover plate to be positioned in the first keyhole and the second keyhole. The upper casing is combined with the lower casing to define an accommodation space, and the upper casing has a through hole. The plunger movably couples with the upper casing to protrude from the through hole, and the plunger has a cam portion. The tactile feedback member and the restoring member are received in the accommodation space. The restoring member provides the restoring force to drive the plunger to move away from the lower casing. When the adjustment frame moves relative to the cover plate, the adjustment portion changes a position of the tactile feedback member relative to the cam portion.

In an embodiment, the tactile feedback member includes a positioning portion and an extending arm. The positioning portion is positioned on the lower casing, and the extending arm extends corresponding to the cam portion.

In an embodiment, the adjustment portion extends from the rib toward the second keyhole and is bent upward from the adjustment frame to extend into the lower casing corresponding to the extending arm.

In an embodiment, the adjustment portion has a first inclined surface. When the adjustment frame moves relative to the cover plate, the extending arm moves along the first inclined surface to change a horizontal distance and a vertical distance between the extending arm and the cam portion.

In an embodiment, the adjustment portion has a first inclined surface, and the lower casing has a second inclined surface. When the adjustment frame moves relative to the cover plate, the extending arm selectively comes in contact with the first inclined surface or the second inclined surface. A vertical distance between the first inclined surface and the cam portion is different from a vertical distance between the second inclined surface and the cam portion.

In an embodiment, the adjustment portion extends from the rib horizontally toward the second keyhole to correspond to the positioning portion.

In an embodiment, part of the plurality of ribs adjacent to the second keyholes serve as the adjustment portions.

In another embodiment, the invention provides a keyswitch including a lower casing, an upper casing, a plunger, a restoring member, a tactile feedback member, and an adjustment unit. The upper casing is combined with the lower casing. The plunger couples with the upper casing to be movable relative to the lower casing, and the plunger has a cam portion. The restoring member is disposed between the lower casing and the plunger to provide a restoring force to move the plunger away from the lower casing. The tactile feedback member includes a positioning portion positioned on the lower casing and an extending arm extending across a moving path of the cam portion. The adjustment unit is disposed corresponding to the tactile feedback member. The adjustment unit includes a plurality of sub-ribs to define an opening for receiving at least a portion of the lower casing therein. The adjustment unit is movable relative to the lower casing to move a portion of the tactile feedback member, so to change a pressing force required for the cam portion to pass the extending arm when the plunger moves toward the lower casing.

In an embodiment, one of the plurality of sub-ribs includes a stepped structure or an inclined structure. When the adjustment unit moves relative to the lower casing, the extending arm selectively comes in contact with different portions of the stepped structure or the inclined structure, so as to change a vertical distance between the extending arm and the cam portion.

In yet another embodiment, the invention provides an adjustment mechanism for adjusting tactile feedback of a plurality of keyswitches of a keyboard, and each of the keyswitches including a tactile feedback member. The adjustment mechanism includes an adjustment frame and a plurality of adjustment portions. The adjustment frame includes a plurality of ribs to define a plurality of keyholes corresponding to the keyswitches. The plurality of adjustment portions are respectively disposed adjacent to the keyholes, and each of the keyholes allows a corresponding one of the keyswitches to be accommodated therein, so that the adjustment portion corresponds to the tactile feedback member of the keyswitch.

In an embodiment, the adjustment mechanism further includes an operation portion bent with respect to the adjustment frame.

In an embodiment, the adjustment frame further includes a positioning structure. The positioning structure includes a positioning hole and at least one wing portion, and the wing portion protrudes toward the positioning hole.

Compared with the prior art, the keyboard and the keyswitch of the invention can provide different kinds of tactile feedback by moving a portion of the tactile feedback member driven by the adjustment mechanism. Moreover, the keyboard and the keyswitch of the invention have the adjustment mechanism designed with openings to at least partially receive the keyswitches, so that the adjustment mechanism (or the adjustment unit) can be disposed at the lateral side of the keyswitch, so as to reduce the space required for accommodating the adjustment mechanism in the thickness direction, to effectively minimize the thickness of the keyboard or the keyswitch, and to improve the feasibility of thinning.

DETAILED DESCRIPTION OF THE PREFERRED EMBODIMENT

Figure 1A:
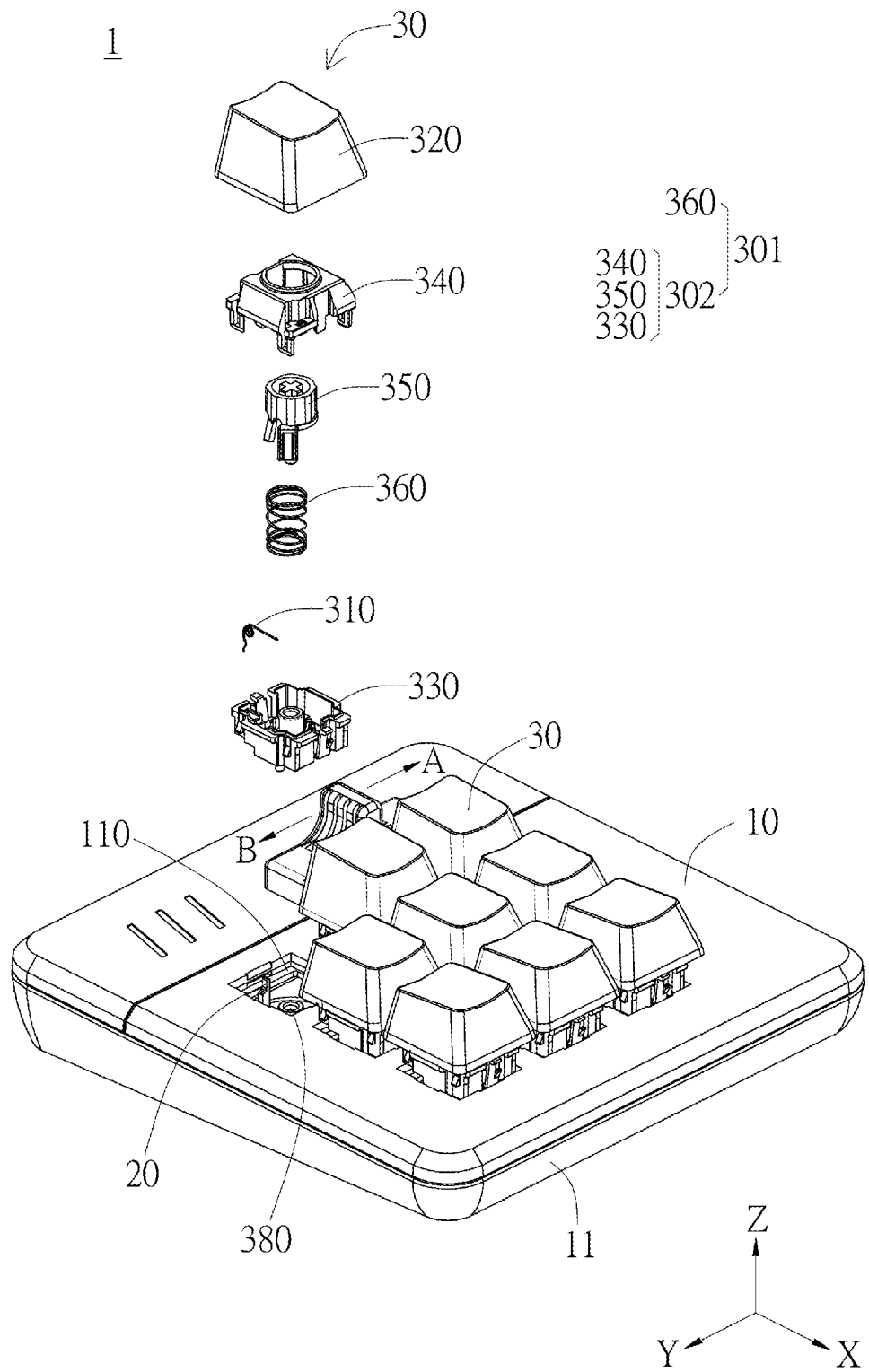
FIGS. 1A and 1B are a partially exploded view and a partial cross-sectional view of the keyboard in a first embodiment of the invention, respectively.
Figure 1B:
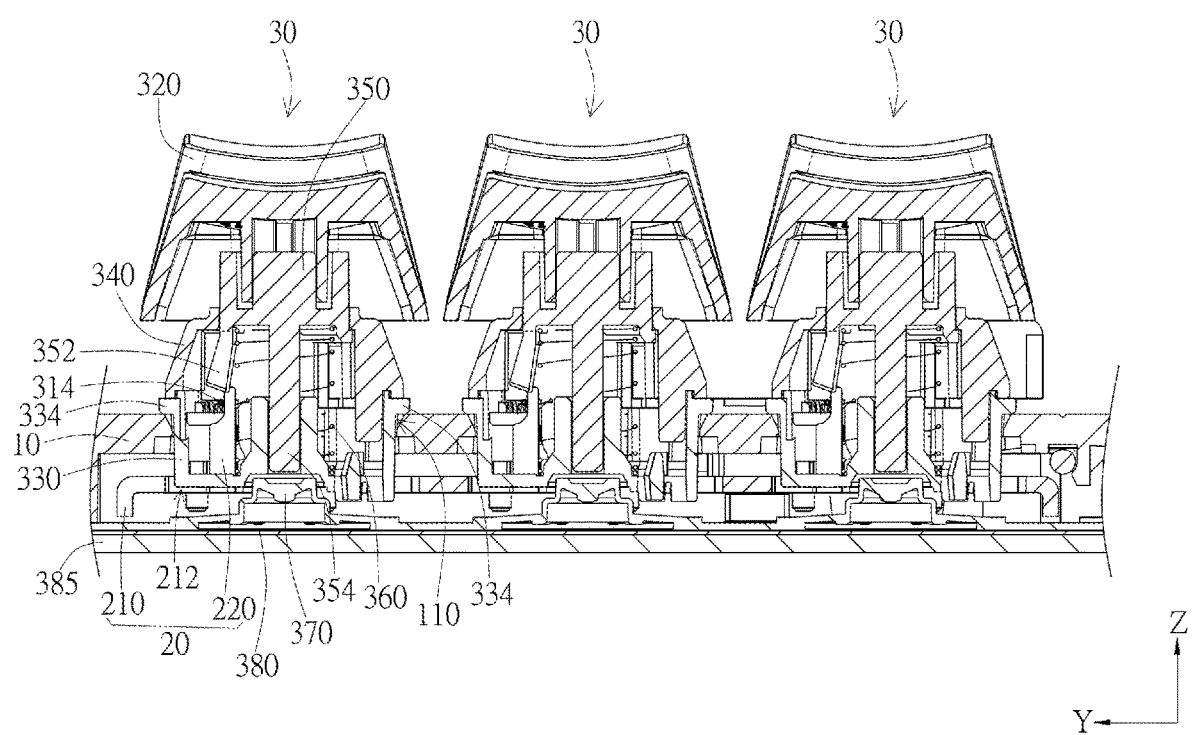

FIGS. 1A and 1B are a partially exploded view and a partial cross-sectional view of the keyboard in a first embodiment of the invention, respectively. As shown in FIGS. 1A and 1B, the keyboard 1 includes a cover plate 10, an adjustment mechanism 20, and a plurality of keyswitches 30. The cover plate 10 has a plurality of first keyholes 110. The adjustment mechanism 20 is disposed under the cover plate 10. The adjustment mechanism 20 includes an adjustment frame 210 and a plurality of adjustment portions 220. The adjustment frame 210 includes a plurality of ribs 215 (shown in FIG. 3E), and the plurality of ribs 215 define a plurality of second keyholes 212. The plurality of second keyholes 212 correspond to the plurality of first keyholes 110, respectively. Each of the adjustment portions 220 is proximate to a corresponding one of the second keyholes 212. Each of the keyswitches 30 includes a tactile feedback member 310, and each keyswitch 30 is located in a corresponding first keyhole 110 and a corresponding second keyhole 212, so that the adjustment portion 220 corresponds to the tactile feedback member 310 of its corresponding keyswitch 30. The adjustment frame 210 is movable relative to the cover plate 10, so that each of the adjustment portions 220 drives a portion of its corresponding tactile feedback member 310 to move, and the tactile feedback of each of the keyswitches 30 can be changed.

Specifically, the keyboard 1 can be an independent device or be integrated into an electronic device, to function as an external or built-in input device. In this embodiment, the keyboard 1 is illustrated with nine keyswitches (e.g. 30), which are arranged in a 3×3 matrix, but not limited thereto. In another embodiment, the keyboard can include at least one keyswitch, and the number and the arrangement of keyswitches in the keyboard are not limited to the embodiment. For example, the keyboard can be a single-key configuration or a QWERTY keyboard.

It is noted that in the keyboard 1, the keyswitch can have any suitable keyswitch structure having the tactile feedback member, such as keyswitch 30, 30A, 30B, 30C described below, but not limited thereto. For example, the keyswitch 30 includes a keycap 320 (shown in FIGS. 1A and 1B) and a restoring mechanism 301. The restoring mechanism 301 is disposed below the keycap 320 and configured to provide a restoring force to enable the keycap 320 to return to a non-pressed position after the keycap 320 is released from being pressed. In addition, the keyswitch can further include a switch unit, which is configured to generate a triggering signal in response to the pressing operation of a user. According to practical applications, the keyswitch can selectively include a light source unit, which is configured to generate light, to form a luminous keyswitch.

Figure 2A:
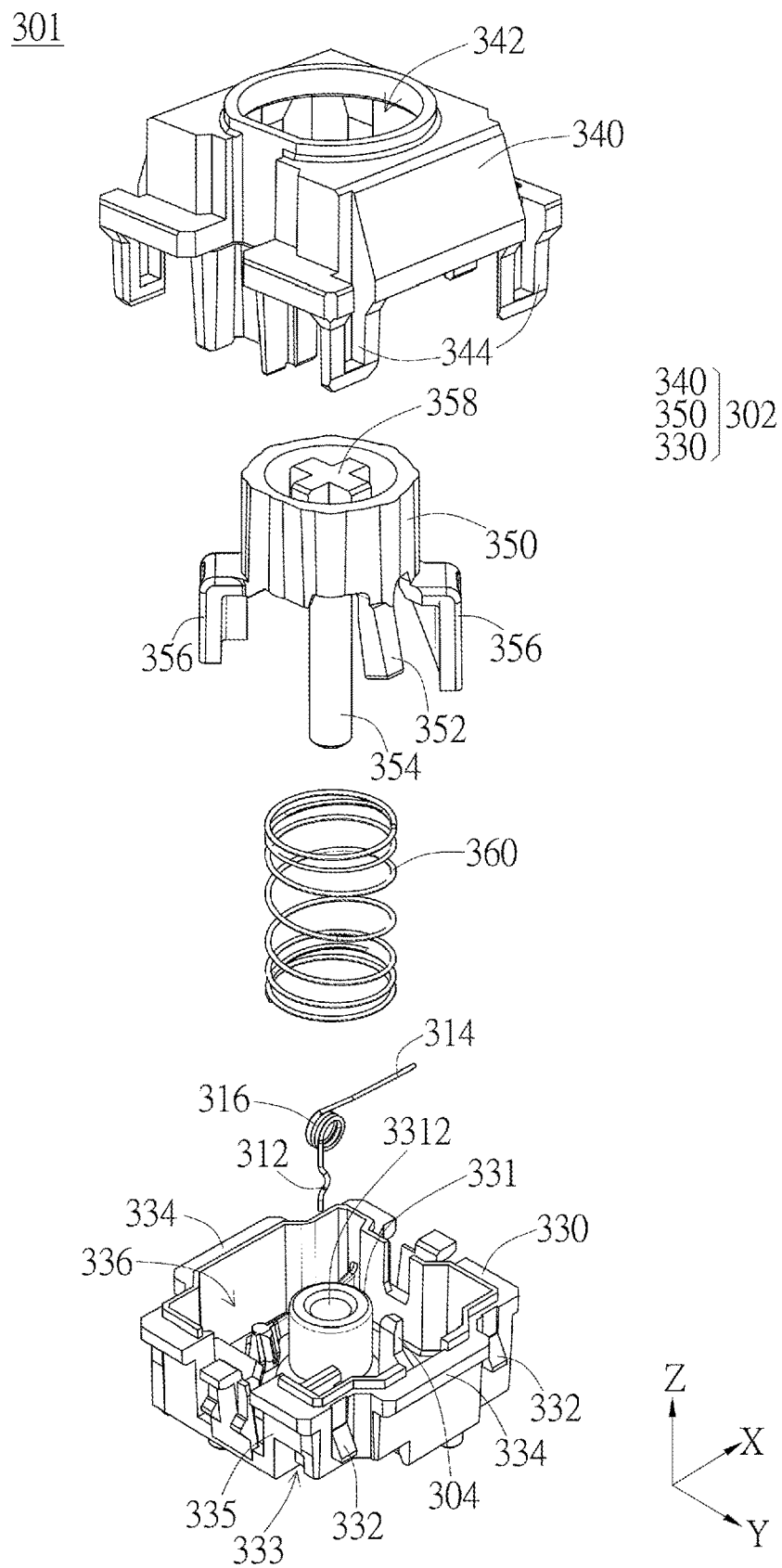
FIGS. 2A and 2B are exploded views of the restoring mechanism of the keyswitch of the keyboard of FIG. 1A from different viewing angles.
Figure 2B:
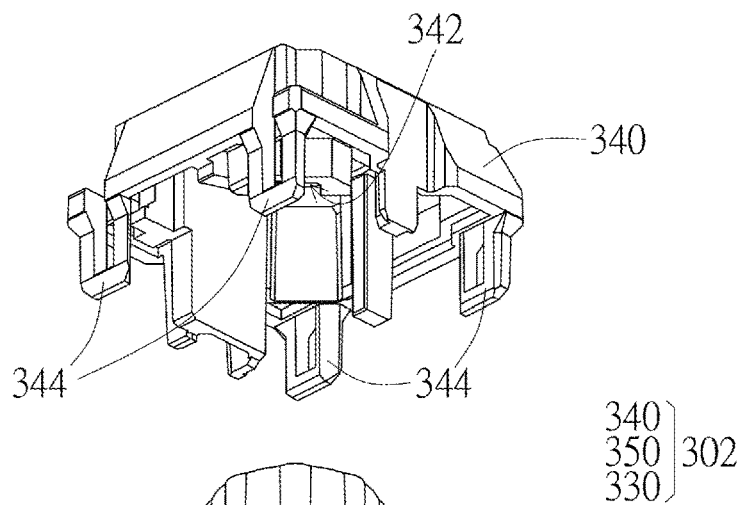
Figure 2B:
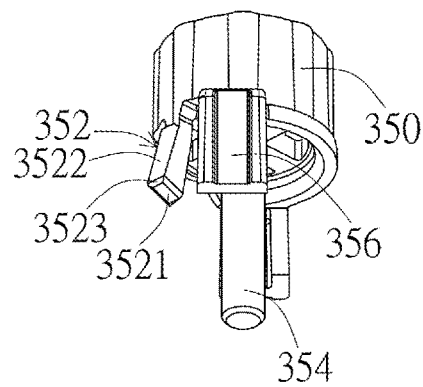
Figure 2B:
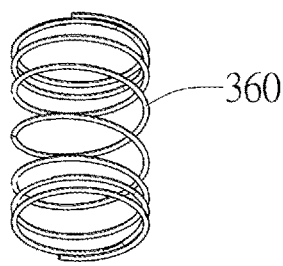
Figure 2B:
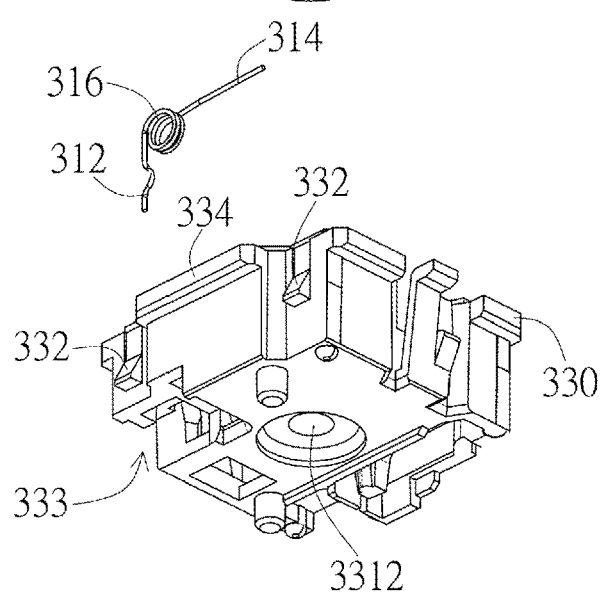

In an embodiment, as shown in FIGS. 2A and 2B, FIGS. 2A and 2B are exploded views of the restoring mechanism of the keyswitch (e.g. 30) of the keyboard 1 of FIG. 1A from different viewing angles. The restoring mechanism 301 includes a casing 302 and a restoring member 360. The restoring member 360 and the tactile feedback member 310 are disposed in the casing 302. The upper portion of the casing 302 protrudes from the first keyhole 110, and the lower portion of the casing 302 is at least partially located within the second keyhole 212. Specifically, the casing 302 includes a lower casing 330, an upper casing 340, and a plunger 350. The lower casing 330 is supported by the cover plate 10 to be positioned in the first keyhole 110 and the second keyhole 212. The upper casing 340 is combined with the lower casing 330 to define an accommodation space 336, and the upper casing 340 has a through hole 342. The plunger 350 movably couples with the upper casing 340 to protrude from the through hole 342, and the plunger 350 has a cam portion 352. The tactile feedback member 310 and the restoring member 360 are received in the accommodation space 336. The restoring member 360 provides the restoring force to drive the plunger 350 as well as the cam portion 352 to move away from the lower casing 330. When the adjustment frame 210 moves relative to the cover plate 10, the adjustment portion 220 changes a position of the tactile feedback member 310 relative to the cam portion 352.

Specifically, the lower casing 330 is preferably a base, which extends along the X-axis, Y-axis, and Z-axis directions, and the upper casing 340 is a cover corresponding to the lower casing 330. The lower casing 330 can be combined with the upper casing 340 to form the casing 302 having the accommodation space 336 therein, and the accommodation space 336 is configured to accommodate the restoring member 360 and the tactile feedback member 310. For example, the lower casing 330 has a hook-like portion 332, and the upper casing 340 has a slot 344. The lower casing 330 and the upper casing 340 are combined by engaging the hook-like portion 332 with the slot 344 along the Z-axis direction. Moreover, the lower casing 330 preferably has a bearing portion 334, which is supported by the cover plate 10. Specifically, the lower casing 330 preferably has two bearing portions 334 disposed at two opposite sides of the lower casing 330 in the Y-axis direction, so that the bearing portions 334 can extend outward as wing portions of the lower casing 330. As shown in FIG. 1B, when the casing 302 is disposed in the first keyhole 110 of the cover plate 10, the bearing portion 334 of the lower casing 330 is supported by the portion of the cover plate 10 around the first keyhole 110, so that the upper casing 340 protrudes from the cover plate 10, and the plunger 350 couples with the keycap 320.

The through hole 342 of the upper casing 340 preferably corresponds to the top portion of the plunger 350 in shape, so that the plunger 350 can be inserted into the through hole 342 from the bottom of the upper casing 340 in a manner that the top portion of the plunger 350 protrudes above the through hole 342. The plunger 350 preferably has a cam portion 352, an actuating portion 354, a restricting portion 356, and a coupling portion 358. For example, the plunger 350 is preferably a cylinder-like object. The cam portion 352 and the restricting portion 356 are preferably disposed along the periphery of the lower end of the plunger 350. The actuating portion 354 protrudes from the lower end of the plunger 350, and the coupling portion 358 is preferably disposed on the top portion of the plunger 350.

Specifically, the cam portion 352 includes a bump extending downward. The bump has a lower surface 3521, an upper surface 3522, and a protrudent point 3523 between the lower surface 3521 and the upper surface 3522. For example, the bump can be an angular block, and the lower surface 3521 and the upper surface 3522 are preferably inclined toward each other and connected at the protrudent point 3523. That is, the protrudent point 3523 protrudes outward (e.g. in the Y-axis direction) with respect to the upper surface 3521 and the lower surface 3522. The actuating portion 354 is disposed corresponding to the switch unit, and the actuating portion 354 is preferably a column, which protrudes downward from the center of the bottom of the plunger 350 and is configured to selectively trigger the switch unit to generate the triggering signal. The restricting portion 356 is preferably a pillar, and in this embodiment, two restricting portions 356 radially extend from two opposite sides of the plunger 350, so that the distance between the two pillars is larger than the size of the through hole 342 of the upper casing 340, so that the plunger 350 is prevented from escaping from the upper casing 340 when the plunger 350 moves relative to the lower casing 330 upwardly. The coupling portion 358 can be a cross-shaped protrusion formed on the top of the plunger 350 and is configured to couple the keycap 320, but not limited thereto. In other embodiments, the coupling portion 358 can have other configurations (e.g. a coupling hole) to couple the keycap 320.

Referring to FIG. 1B and FIGS. 2A to 2C, the arrangement of components in the lower casing 330 will be described in detail. In this embodiment, the restoring member 360 is preferably a spring, and the lower casing 330 has a holding portion 331, so that the restoring member 360 can be positioned by the holding portion 331. For example, the holding portion 331 can be a ring-shaped wall extending from the bottom surface of the lower casing 330 toward the upper casing 340. One end of the spring which serves as the restoring member 360 can be sleeved on the holding portion 331, and the actuating portion 354 of the plunger 350 is inserted into the hollow space 3312 surrounded by the ring-shaped wall, so that the other end of the spring is against the bottom surface of the plunger 350, and the top portion of the plunger 350 protrudes from the through hole 342 of the upper casing 340. As such, when the keycap 320 is pressed to push the plunger 350 to move toward the lower casing 330, the plunger 350 compresses the spring. When the pressing force is released, the spring provides the restoring force to enable the plunger 350 as well as the keycap 320 to move away from the lower casing 330 back to the position before being pressed.

In this embodiment, the tactile feedback member 310 includes a positioning portion 312 and an extending arm 314. The positioning portion 342 is positioned on the lower casing 330, and the extending arm 314 extends corresponding to the cam portion 352. Specifically, the tactile feedback member 310 can be implemented as a torsion spring. The positioning portion 312 and the extending arm 314 of the tactile feedback member 310 respectively extend from two opposite ends of the torsion spring. An angle between the extending direction of the positioning portion 312 and the extending direction of the extending arm 314 is preferably equal to or smaller than 120 degrees. For example, the positioning portion 312 and the extending arm 314 are two rods extending from two opposite ends of the spring body 316, and the angle between the extending directions of the two rods is preferably not more than 120 degrees.

Figure 2C:
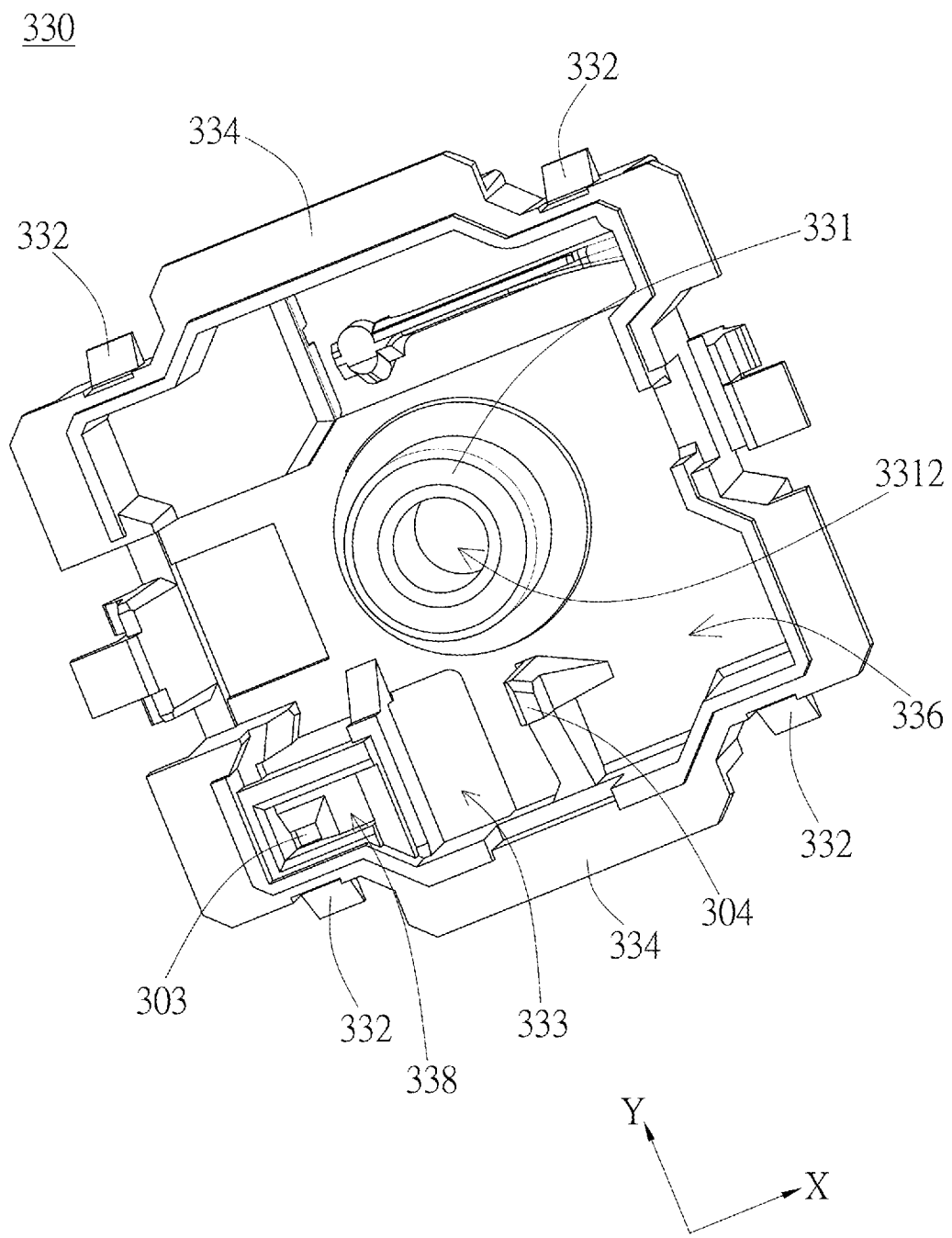
FIG. 2C is a schematic view of the lower casing of FIG. 2A from a different viewing angle.

As shown in FIG. 2C, corresponding to the tactile feedback member 310, the lower casing 330 preferably has a positioning hole 303, which is configured to allow the positioning portion 312 to be inserted therein to position the tactile feedback member 310. The lower casing 330 further has an opening 333, which is configured to allow the adjustment portion 220 of the adjustment mechanism 20 to extend into the lower casing 330. For example, the opening 333 is preferably a notch, which is partially hollowed out from the sidewall 335 adjacent to the positioning hole 303 toward the bottom of the lower casing 330. The opening 333 communicates with the accommodation space 336. When the upper portion of the lower casing 330 is disposed in the first keyhole 110 of the cover plate 10 and supported by means of the bearing portion 334, the lower portion (or bottom portion) of the lower casing 330 is at least partially located in the second keyhole 212 of the adjustment frame 210, so that the location of the adjustment portion 220 corresponds to the opening 333. As such, the adjustment frame 210 is located at the lateral side of the lower casing 330, i.e., the lower portion of the lower casing 330 is at least partially surrounded by the adjustment frame 210, so that the projection of the adjustment frame 210 in the X-axis direction and/or the Y-axis direction at least partially falls on the sidewall (e.g. 335) of the lower casing 330. That is, the adjustment frame 210 and the sidewall of the lower casing 330 at least partially overlap each other in the X-axis direction and/or Y-axis direction. With such a configuration, the space required for accommodating the adjustment frame 210 in the Z-axis direction (or thickness direction) can be reduced to facilitate the thinning effect of the keyboard or to enhance the accommodation space for other components of the keyswitch, so as to improve the tactile feedback adjustment of various types of the keyswitch.

The lower casing 330 further has an accommodation area 338, which is configured to accommodate the spring body 316 of the tactile feedback member 310. For example, the accommodation area 338 can be a space defined by a plurality of partition walls to restrict the movement of the tactile feedback member 310. When the adjustment portion 220 drives the tactile feedback member 310 to partially move (e.g. pushes the positioning portion 312 or the extending arm 314 to move), the spring body 316 is confined in the accommodation area 338, so the tactile feedback member 310 has a different deformation. When the tactile feedback member 310 is disposed on the lower casing 330, the positioning portion 312 is inserted into the positioning hole 303, the spring portion 316 is received in the accommodation area 338, and the extending arm 314 extends below the plunger 350 and selectively across the moving path of the cam portion 352 of the plunger 350. That is, the positioning portion 352 is inserted into the positioning hole 303 substantially along the Z-axis direction, and the extending arm 314 substantially extends along the X-axis direction to selectively pass the moving path of the cam portion 352. The lower casing 330 further includes an impact portion 304, which is configured to be hit by the extending arm 314 to generate a sound. For example, the impact portion 304 can be a wall protruding from the bottom of the lower casing 330 toward the upper casing 340, and the wall has an impact surface facing the extending arm 314.

As shown in FIG. 1B, in an embodiment, the keyswitch 30 further includes a resilient member 370 and a switch layer 380. The resilient member 370 is disposed below the casing 302, and the switch layer 380 functions as the switch unit and is disposed below the resilient member 370. When the keycap 320 is pressed, the resilient member 370 deforms to trigger the switch layer 380 to generate the triggering signal. Specifically, the resilient member 370 is disposed below the hollow space 3312 of the holding portion 331 of the lower casing 330 to correspond to the actuating portion 354 of the plunger 350. That is, the resilient member 370 is disposed below the hollow space 3312 surrounded by the ring-shaped wall. The switch layer 380 can be a membrane switch, which is constituted by multiple layers. When the keycap 320 is pressed, the actuating portion 354 moves downward in the hollow space 3312 to compress the resilient member 370, so that the resilient member 370 deforms to trigger the switch layer 380 to generate the triggering signal. Moreover, the keyswitch 30 may further include a plate member 385. The plate member 385 is preferably disposed below the switch layer 380 to function as the structural support of keyswitch 30, but not limited thereto. For example, according to practical applications, the plate member 385 can be a baseplate or a circuit board, and the switch layer 380 can be disposed above or below the plate member 385.

It is noted that the resilient member 370 and the switch layer 380 are illustrated as the switch component of the keyswitch 30 in the embodiment, but not limited thereto. In another embodiment, the keyswitch may have other types of switch component, which selectively generates the triggering signal in response to the movement of the plunger 350. For example, in another embodiment, the keyswitch may include an emitter and a receiver, which are electrically connected to a circuit board to function as the switch component, i.e. optical switch, so that the keyswitch can generate the triggering signal by changing the amount of light received by the receiver from the emitter when the plunger 350 moves toward the lower casing 330. In yet another embodiment, the keyswitch may include an electrode module, which is electrically connected to a circuit board to function as the switch component, i.e. mechanical switch, so that the keyswitch can generate the triggering signal by changing the electrical state of the electrode module (e.g. conduction or non-conduction) when the plunger 350 moves toward the lower casing 330.

Referring again to FIGS. 1A and 1B, the cover plate 10 is preferably the upper outer housing of the keyboard 1, and can be combined with the lower outer housing 11 of the keyboard 1, so that the lower outer housing 11 and the cover plate 10 enclose an accommodation space for accommodating at least part of the components of the keyswitches 30, and the keycaps 320 are exposed on the cover plate 10 and provided for the user to operate, but not limited thereto. In another embodiment, the cover plate 10 can be a plate member inside the keyboard, and the keyboard includes an additional upper outer housing to promote the outer appearance. The number of the first keyholes 110 of the cover plate 10 preferably corresponds to the number of the keyswitches. For example, in this embodiment, the cover plate 10 is formed with nine through holes, which penetrate the cover plate 10, to serve as the first keyholes 110, and each first keyhole 110 preferably has a size corresponding to the keyswitch (e.g. 30). For example, the first keyhole 110 preferably corresponds to the lower casing 330 in size, so that when the keyswitch 30 is received in the first keyhole 110, the bearing portion 334 of the lower casing 330 is supported on the surface of the cover plate 10, which is adjacent to the first keyhole 110, but not limited thereto. In another embodiment, according to practical applications, the keyswitch can be positioned in the first keyhole 110 of the cover plate 10 by any suitable positioning means.

Figure 3A:
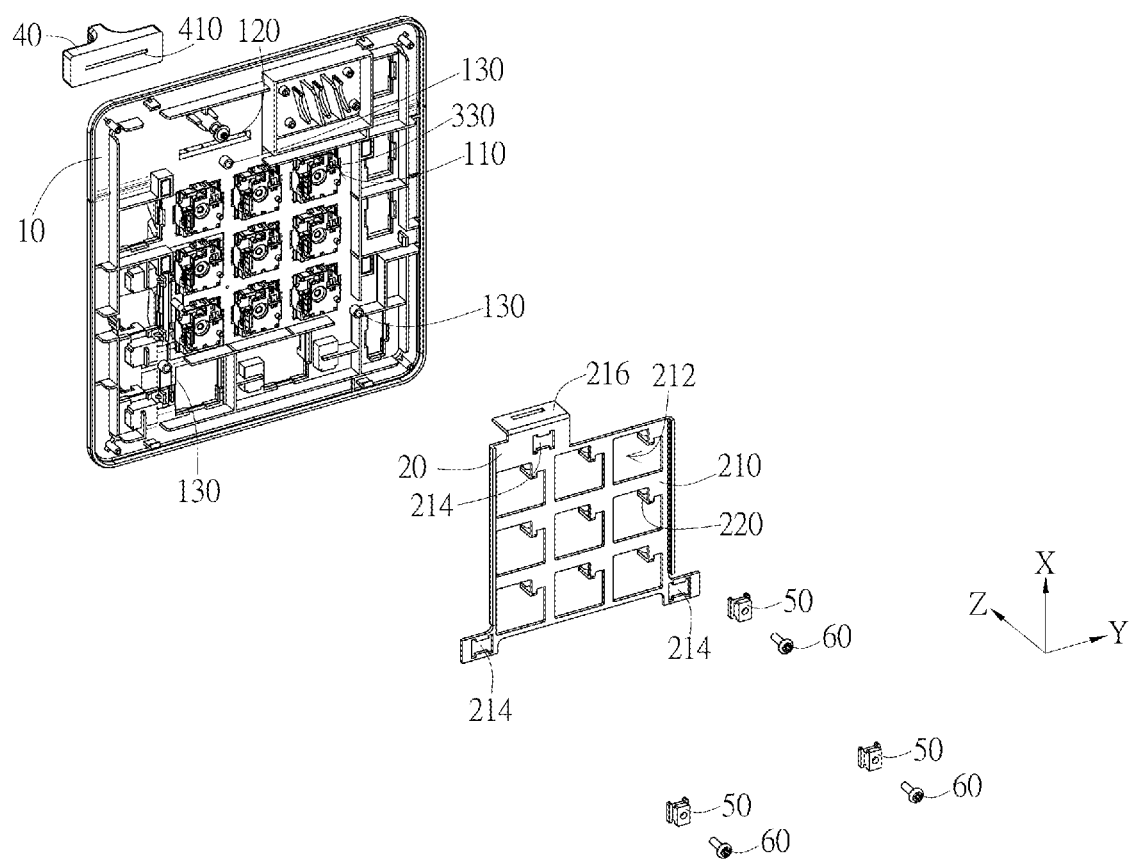
FIGS. 3A to 3C are an exploded view, an assembled view, and a partial cross-sectional view of the adjustment mechanism positioned on the cover plate in an embodiment of the invention, respectively.
Figure 3B:
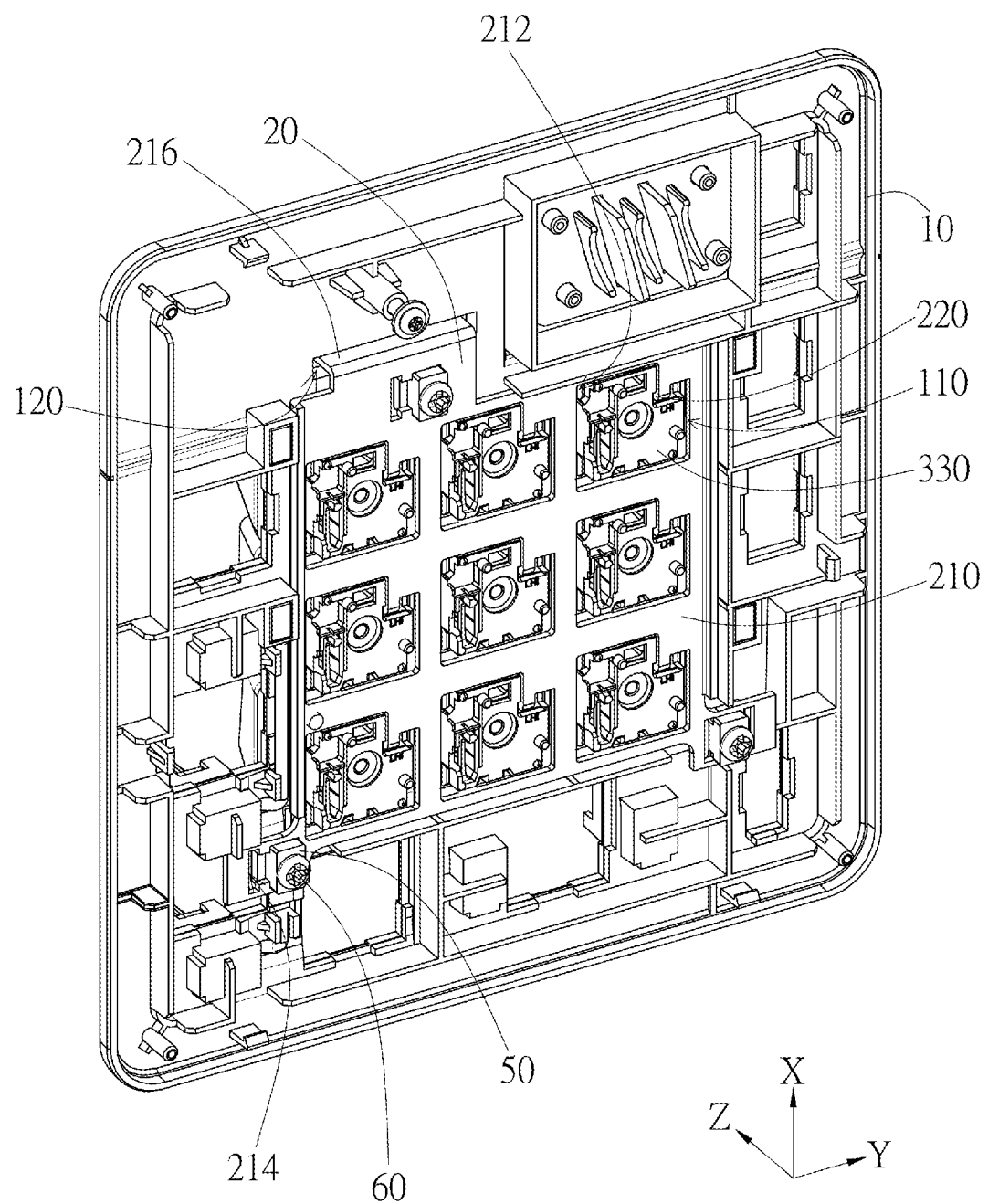
Figure 3C:
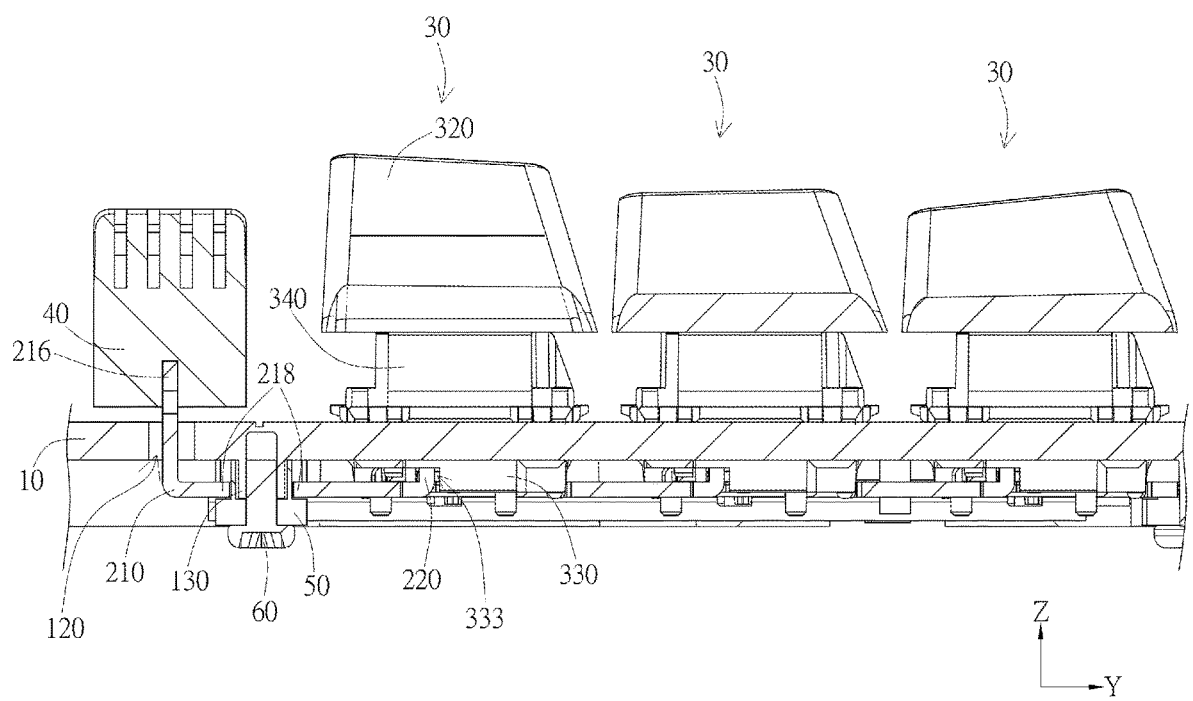
Figure 3D:
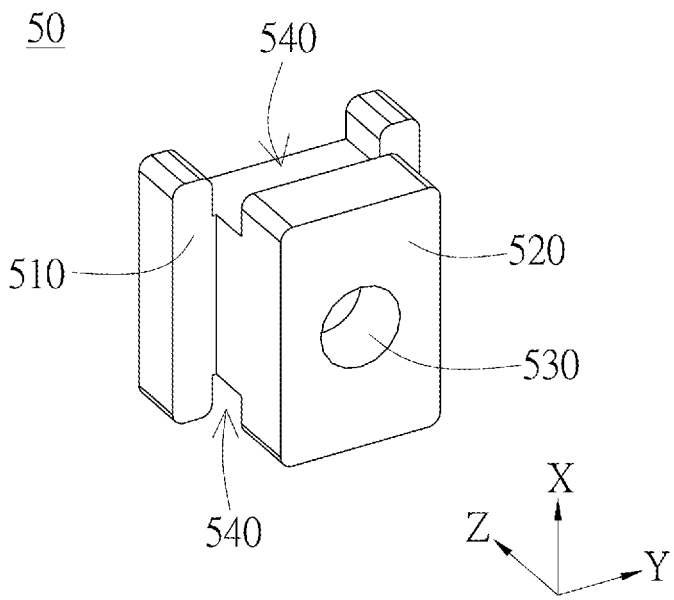
FIG. 3D is an enlarged view of the positioning block of FIG. 3A.
Figure 3E:
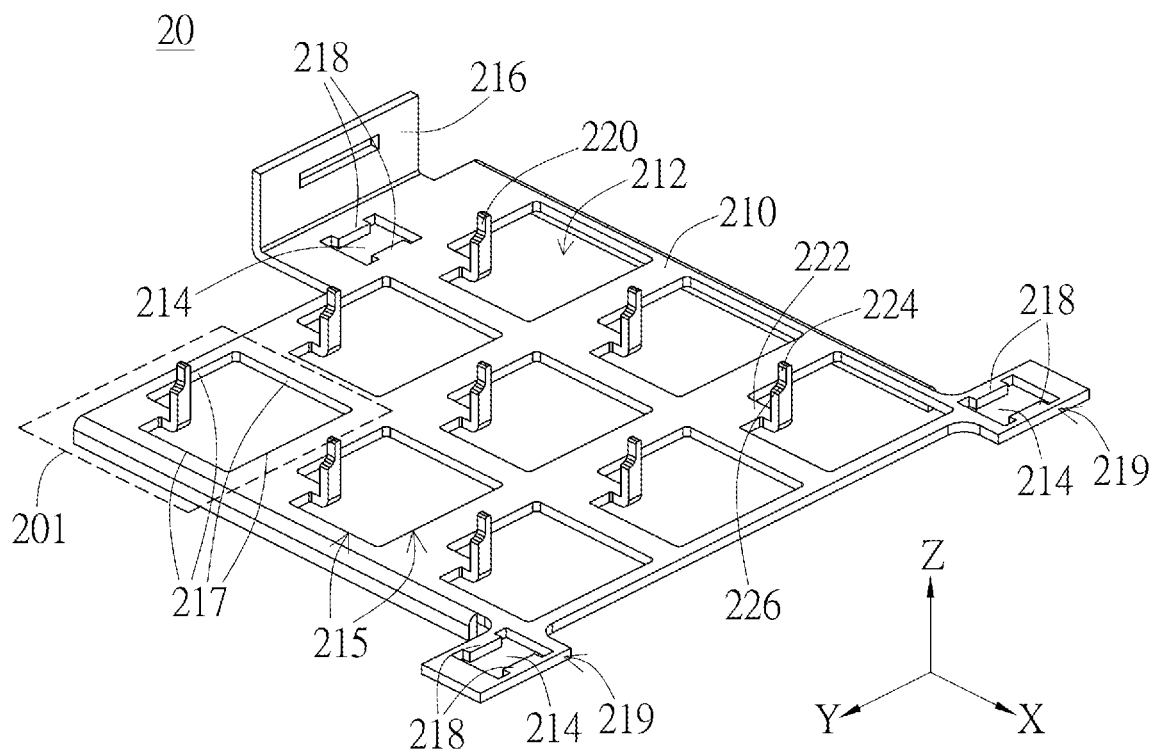
FIG. 3E is a schematic view of the adjustment mechanism of FIG. 3A.

The adjustment mechanism 20 may have different configurations with respect to the portion of the tactile feedback member 310 to be adjusted, such as the positioning portion 312 or the extending arm 314. As shown in FIG. 3E, in an embodiment, the adjustment frame 210 includes a plurality of ribs 215, which are connected with each other in the X-axis direction and the Y-axis direction, to define a plurality of second keyholes 212 corresponding to the keyswitches. The number of the second keyholes 212 corresponds to that of the keyswitches, such as nine. In other words, the adjustment frame 210 can be a plate member having a plurality of holes, which penetrate the plate member and serve as the second keyholes 212, and the portion of the plate member surrounding the holes can be embodied as the plurality of interconnected ribs 215. As such, the adjustment frame 210 can have a mesh screen-like configuration. From another aspect, the adjustment mechanism 20 can be considered as an integral component, which is formed by connecting the plurality of adjustment units 201 (indicated by dotted lines in FIG. 3E) of the plurality of keyswitches 30. Each adjustment unit 201 includes a plurality of sub-ribs 217 to define an opening (i.e., the second keyhole 212), so that each adjustment unit 201 may have a frame shaped. In other words, when the plurality of keyswitches are integrated into the keyboard, the plurality of sub-ribs 217 of the adjustment units 201 are connected to each other to form the plurality of ribs 215, so that the adjustment frame 210 is constructed. When the adjustment mechanism 20 is positioned relative to the cover plate 10, the plurality of first keyholes 110 of the cover plate 10 are aligned with the plurality of second keyholes 212 of the adjustment mechanism 20, respectively. That is, the projection areas of the aligned first keyhole 110 and second keyhole 212 at least partially overlap with each other in a direction penetrating the openings (e.g. Z-axis direction), so that the upper portion of the casing 302 of the keyswitch 30 can protrude from the first keyhole 110, and the lower portion of the casing 302 is at least partially received in the second keyhole 212.

In this embodiment, the adjustment portion 220 can be an adjustment bar, which extends from the rib 215 (or sub-rib 217) toward the second keyhole 212 and is bent upward from the adjustment frame 210 to extend into the lower casing 330 corresponding to the extending arm 314 of the tactile feedback member 310. For example, when the lower portion (or bottom portion) of the lower casing 330 is inserted in the second keyhole 212 of the adjustment frame 210, the opening 333 of the lower casing 330 corresponds to the adjustment portion 220, so that the adjustment portion 220 can extend into the accommodation space 336 of the lower casing 330, and the adjustment frame 210 is located at the lateral side of the lower casing 330 adjacent to the notched bottom, i.e., proximate to the middle section of the sidewall 335.

In an embodiment, the adjustment portion 220 includes a horizontal section 222 and a vertical section 224. The horizontal section 222 extends from the rib 215 along the X-axis direction in the second keyhole 212, and the vertical section 224 extends from the distal end of the horizontal section 222 along the Z-axis direction, i.e., the vertical section 224 is bent upward from the horizontal section 222. When the lower portion (or bottom portion) of the lower casing 330 is received in the second keyhole 212 of the adjustment frame 210, the length of the horizontal portion 222 of the adjustment portion 220 is sufficient to allow the horizontal section 222 to extend, from the lateral side of the lower casing 330, into the opening 333 to the accommodation space 336 corresponding to the extending arm 314 of the tactile feedback member 310, and the length of the vertical section 224 is long enough to allow the top of the vertical portion 224 to exceed the height of the extending arm 314 in the Z-axis direction. In an embodiment, the adjustment portion 220 preferably has a notch 226, which is recessed inward from the wall surface of the vertical section 224 facing the extending arm 314, and the notch 226 corresponds to the longitudinal direction of the extending arm 314. For example, the notch 226 can be an L-shaped notch, i.e., the top of the vertical section 224 has a stepped configuration. The extending arm 314 extends through the notch 226 to enhance the linking effect of the adjustment portion 220 and the extending arm 314, but not limited thereto. In another embodiment, the adjustment portion 220 may not have the notch 226, and the extending arm 314 abuts against the wall surface of the vertical section 224.

In a preferred embodiment, the adjustment mechanism 20 is movably positioned on the cover plate 10. FIGS. 3A to 3C are an exploded view, an assembled view, and a partial cross-sectional view of the adjustment mechanism 20 positioned on the cover plate 10 in an embodiment of the invention, respectively. As shown in FIGS. 3A to 3C, the keyboard 1 further includes a positioning block 50 and a bolt 60. The positioning block 50 is disposed between the cover plate 10 and the adjustment frame 210, and the bolt 60 is configured to secure the positioning block 50 on the cover plate 10. As shown in FIG. 3D, the positioning block 50 is an H-shaped block, and the positioning block 50 has a structure defining a bolt hole 530 and a channel 540. The bolt hole 530 is provided for the bolt 60 to be inserted thereinto, and the adjustment frame 210 can be partially received in the channel 540. The positioning block 50 includes a lower sub-block 510 and an upper sub-block 520. The bolt hole 530 is a through hole penetrating the lower sub-block 510 and the upper sub-block 520, and the channel 540 is formed at the lateral side of the positioning block 50 between the lower sub-block 510 and the upper sub-block 520. Specifically, the lower sub-block 510 is connected to the bottom of the upper sub-block 520 and extend from the lateral side of the upper block 520 as wing portions. In this embodiment, the lower sub-block 510 extends along the X-axis direction and extends outward with respect to the upper sub-block 520 from two opposite sides in the Y-axis direction. The upper sub-block 520 is shrunk with respect to the lower sub-block 510 from two opposite sides in the X-axis direction to form the channels 540. That is, the channel 540 is a space sandwiched by the side portions of the upper sub-block 520 and the lower sub-block 510, and the channel 540 extends parallel to the Y-axis direction.

Corresponding to the positioning block 50, the adjustment frame 210 of the adjustment mechanism 20 further includes a positioning structure 219. The positioning structure 219 includes a positioning hole 214 and at least one wing portion 218. The wing portion 218 protrudes toward the positioning hole 214, and the positioning block 50 is received in the positioning hole 214. As shown in FIGS. 3A and 3E, the positioning structure 219 is preferably located at the side of the adjustment frame 210 and connected to at least one of the plurality of ribs 215, so that the positioning structure 219 and the plurality of ribs 215 together form an integral adjustment frame 210. In other words, the positioning structure 219 can be embodied as an extension portion of the adjustment frame 210 from the rib 215. Corresponding to the shape of the positioning block 50, the positioning hole 214 is preferably an H-shaped opening. The positioning hole 214 extends along the Y-axis direction, and the hole width in the X-axis direction at two end portions is larger than the hole width at the middle portion. As such, the portion of the adjustment frame 210 defining the middle portion of the positioning hole 214 forms the wing portion 218. In other words, two wing portions 218 are disposed at two sides of the middle portion of the positioning hole 214 along the X-axis direction. When the positioning block 50 is received in the positioning hole 214 of the adjustment frame 210, the wing portion 218 is clamped between the lower sub-block 510 and the upper sub-block 520 in the channel 540. As such, the movement of the adjustment frame 210 in the Z-axis direction and the X-axis direction are limited, and the adjustment frame 210 is allowed to move in the Y-axis direction relative to the positioning block 50. Moreover, the cover plate 10 may have a stud portion 130 at the bottom. The stud portion 130 has a screw hole (or a bolt hole), and the stud portion 130 corresponds to the bolt hole 530 of the positioning block 50. When the adjustment mechanism 20 is positioned on the cover plate 10, the stud portion 130 is inserted into the bolt hole 530 of the positioning block 50, and the bolt 60 is secured to the screw hole of stud portion 130, so that the adjustment frame 210 can be movably mounted on the cover plate 10 by movably engaging with the positioning block 50.

It is noted that the adjustment mechanism 20 is illustrated to be positioned on the cover plate 10 by means of three positioning structures 219 and three positioning blocks 50, but the number and the location of positioning blocks 50 are not limited to the embodiment. In another embodiment, the adjustment mechanism 20 and the cover plate 10 can be movably positioned by any suitable positioning means, such as positioning rail and groove.

As shown in FIGS. 3A and 3E, the adjustment mechanism 20 further includes an operation portion 216. The operation portion 216 extends from the adjustment frame 210 and is bent upward toward the cover plate 10. The operation portion 216 is provided for the user to control the movement of the adjustment mechanism 20. Specifically, the bending direction of the operation portion 216 is the same as the adjustment portion 220, i.e., bent toward the cover plate 10 along the Z-axis direction. The cover plate 10 further has an opening 120 disposed corresponding to the operation portion 216, so that the operation portion 216 can extend through the opening 120 and protrude above the cover plate 10. In an embodiment, the keyboard 1 further includes an operation button 40. The operation button 40 is capped on the operation portion 216 to facilitate the operation comfort and the outer appearance. For example, the operation button 40 has a slot 410 in the bottom. The operation portion 216 can be inserted into the slot 410, so that the operation button 40 is arranged on the operation portion 216.

Figure 4A:
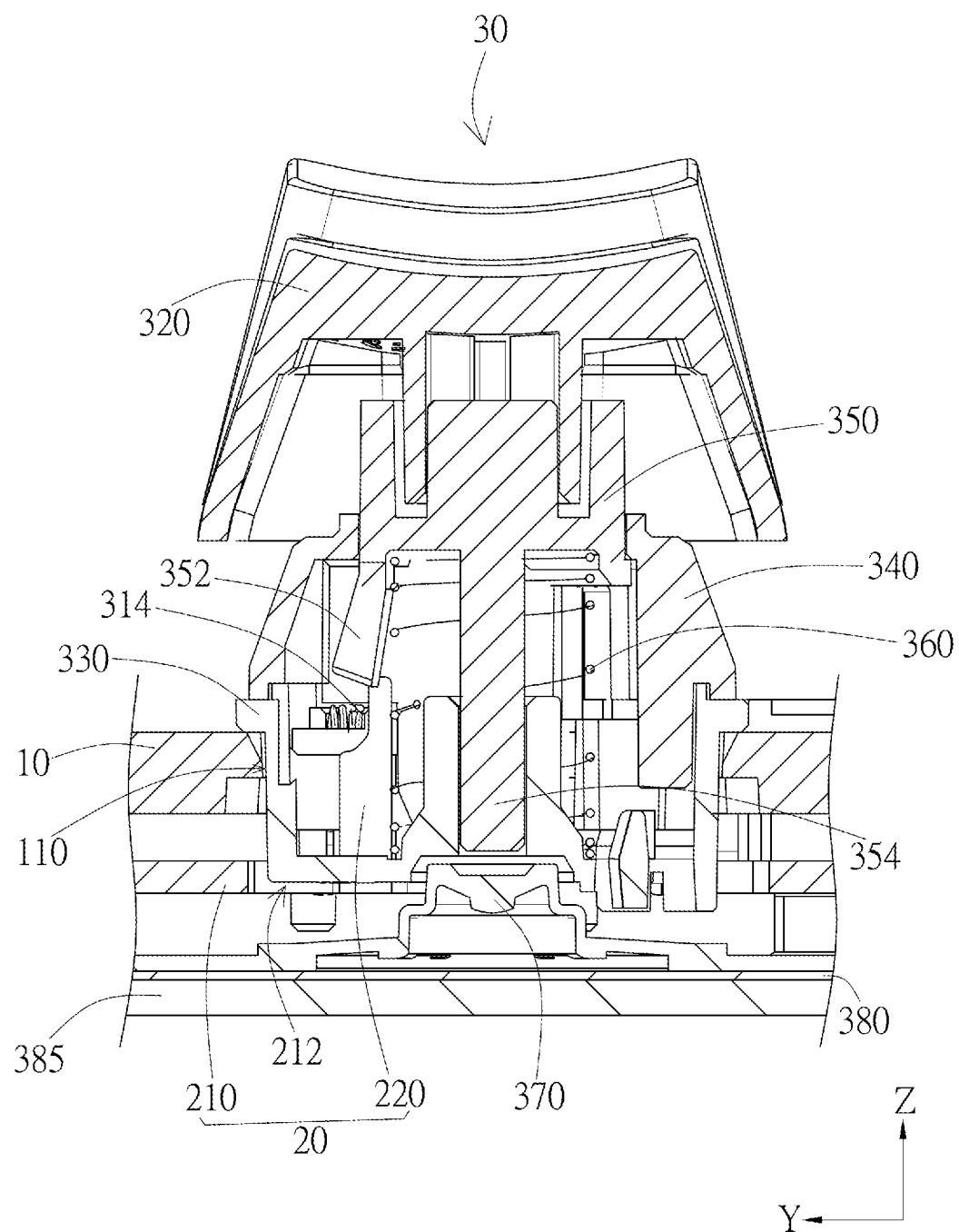
FIG. 4A is a cross-sectional view of the keyswitch of FIG. 1A with the first tactile feedback.
Figure 4B:
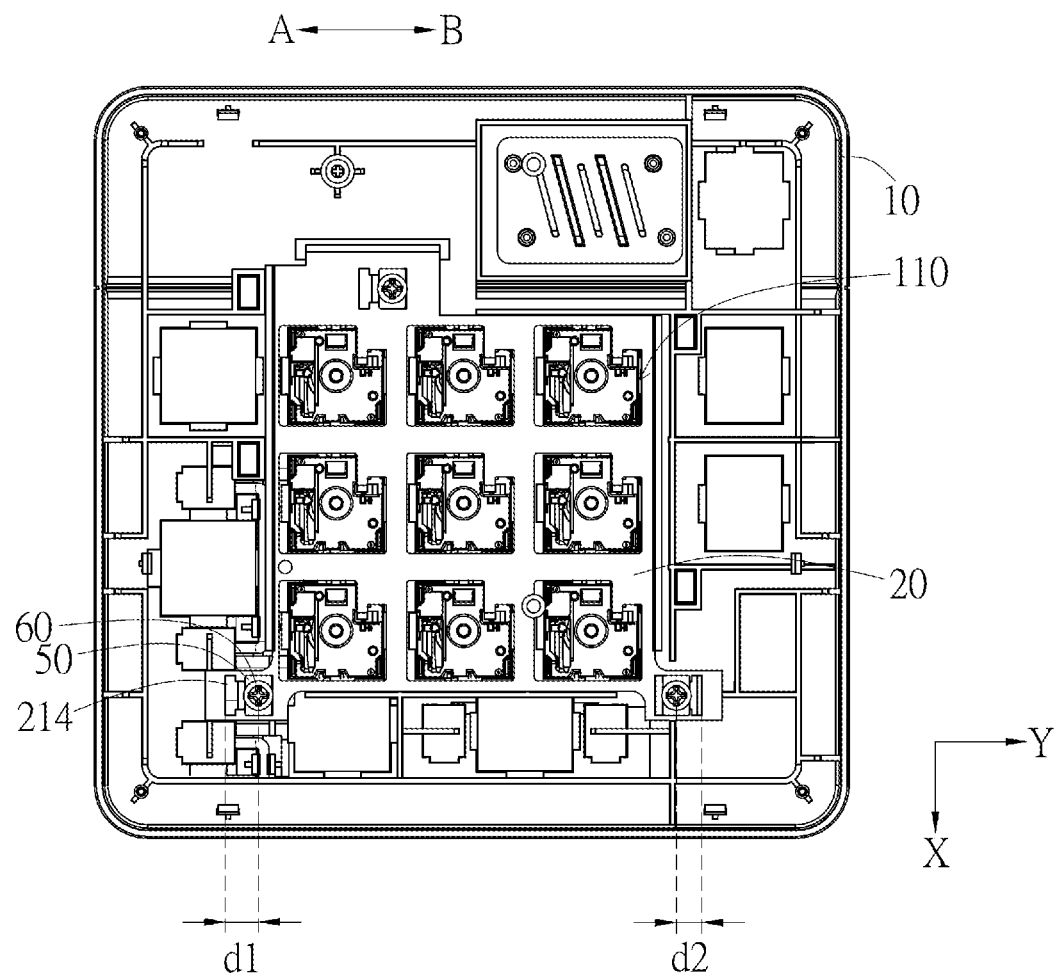
FIGS. 4B and 4C are a bottom view and a partial cross-sectional view showing the relative position of the adjustment mechanism to the cover plate when the keyswitch is at the status of FIG. 4A, respectively.
Figure 4C:
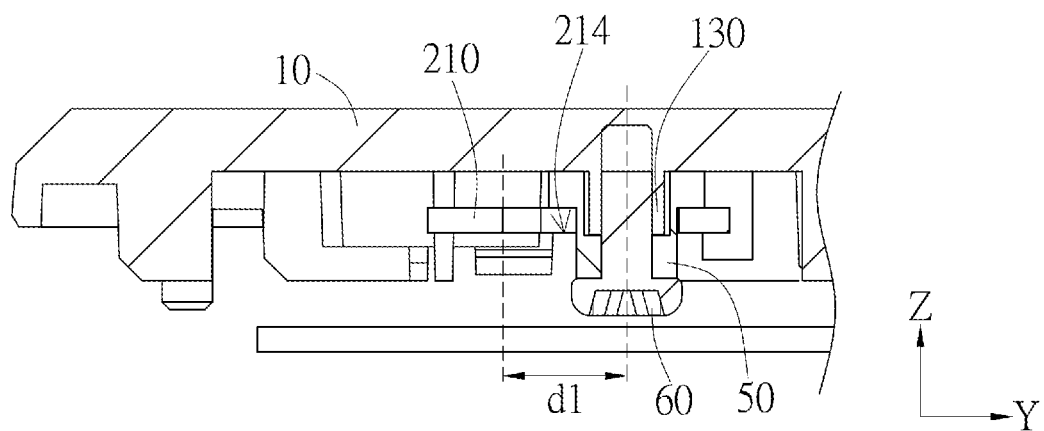

Hereinafter, the tactile feedback adjustment of the key-switches 30 in the keyboard 1 by using the adjustment mechanism 20 will be illustrated. FIG. 4A is a cross-sectional view of the keyswitch 30 of FIG. 1A with the first tactile feedback. FIGS. 4B and 4C are a bottom view and a partial cross-sectional view showing the relative position of the adjustment mechanism 20 to the cover plate 10 when the keyswitch is at the status of FIG. 4A, respectively. As shown in FIG. 1A and FIG. 4A, when the adjustment mechanism 20 is located at a first position in the Y-axis direction (e.g., the operation button 40 of the keyboard 1 moves toward the direction A), the extending arm 314 is located at the first position with respect to the moving path of the cam portion 352. As shown in FIGS. 4B and 4C, when the adjustment frame 210 is located at the first position, the distance between the left edge of the left positioning hole 214 and the center of the bolt hole 530 of the corresponding positioning block 50 (e.g. left positioning block) is d1, and the distance between the right edge of the right positioning hole 214 and the center of the bolt hole 530 of the corresponding positioning block 50 (e.g. right positioning block) is d2. In this embodiment, when the adjustment frame 210 is located at the first position in the Y-axis direction, the extending arm 314 preferably extends across the moving path of the cam portion 352 when moving downward, i.e. the moving path is parallel to the Z-axis direction, and the pressing force required for the cam portion 352 moving toward the lower casing 330 and passing the extending arm 314 is a first pressing force. In other words, when the adjustment frame 210 is located at the first position in the Y-axis direction, the extending arm 314 is located inside the moving path of the cam portion 352, so that when the cam portion 352 moves downward, the cam portion 352 will interfere with the extending arm 314 to provide the first tactile feedback of the first pressing force. Specifically, when the adjustment frame 210 is located at the first position in the Y-axis direction, and the first pressing force is exerted to enable the keycap 320 along with the plunger 350 to move toward the lower casing 330, and the cam portion 352 interferes with the extending arm 314, so that the extending arm 314 firstly moves downward along the lower surface 3521 to the protrudent point 3523, and then passes the protrudent point 3523 to move upward to provide the first tactile feedback. It is noted that when the extending arm 314 reaches the protrudent point 3523, the extending arm 314 has a first sound distance from an impact surface of the lower casing 330 or the upper casing 340, and then, the extending arm 314 hits the impact surface to generate a sound, such as a first sound. In this embodiment, the impact surface can be a wall surface of the upper casing 340 or the lower casing 330 that corresponds to the extending arm 314, such as the impact surface of the impact portion 304 of the lower casing 330.

Figure 5A:
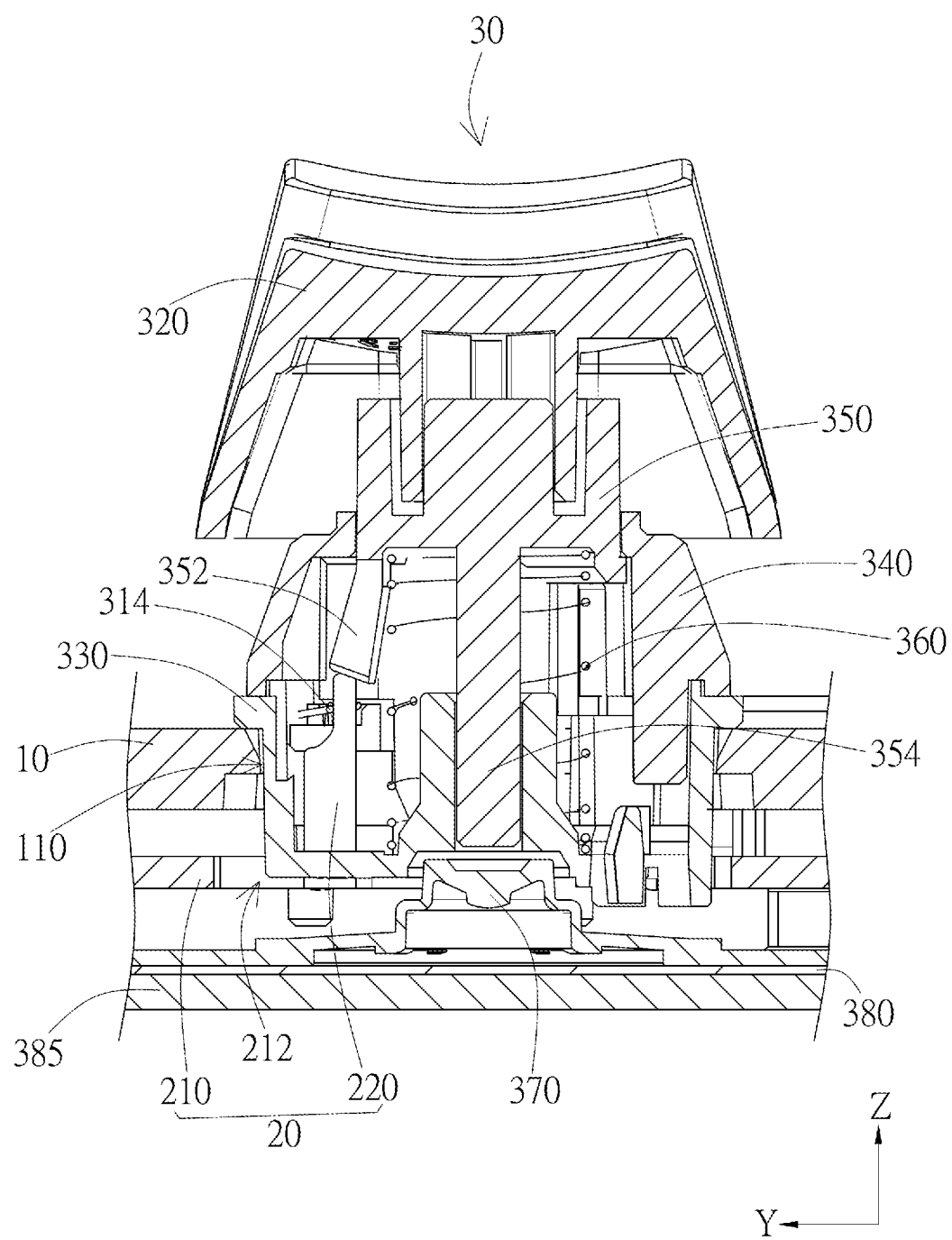
FIG. 5A is a cross-sectional view of the keyswitch of FIG. 1A with the second tactile feedback.
Figure 5B:
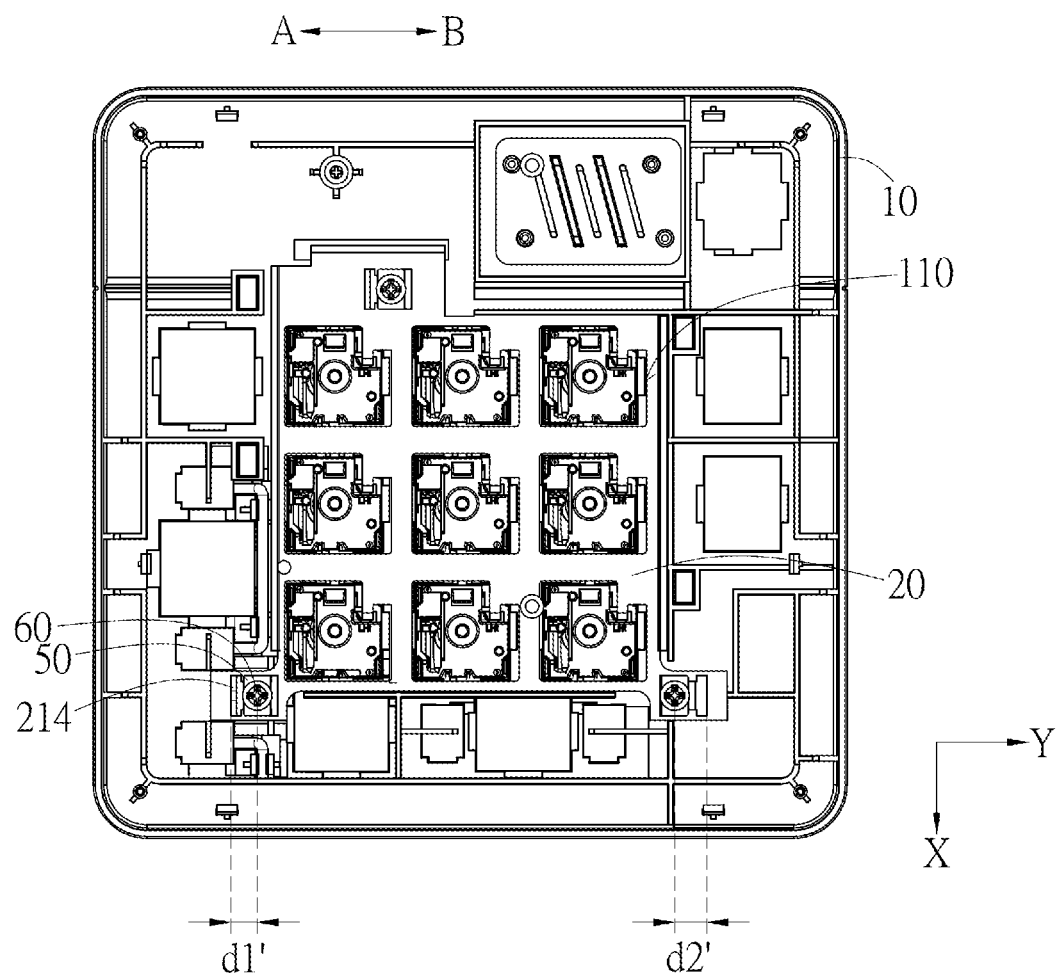
FIGS. 5B and 5C are a bottom view and a partial cross-sectional view showing the relative position of the adjustment mechanism to the cover plate when the keyswitch is at the status of FIG. 5A, respectively.
Figure 5C:
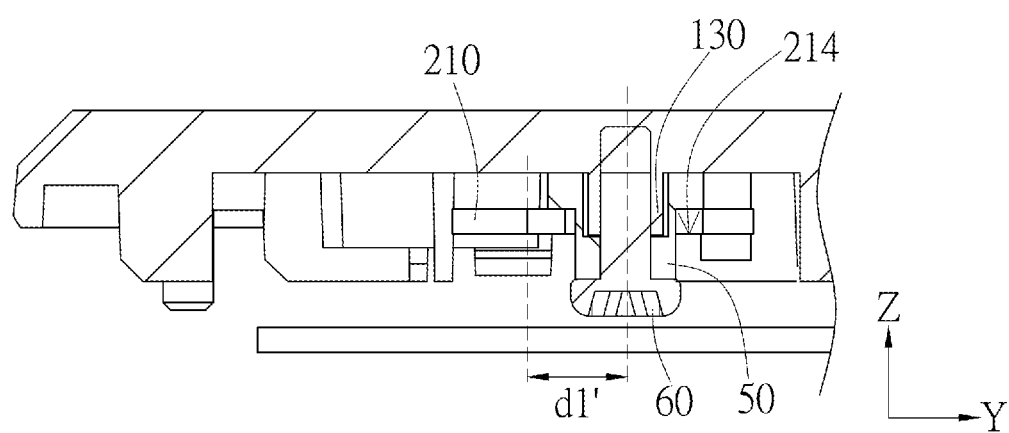

FIG. 5A is a cross-sectional view of the keyswitch 30 of FIG. 1A with the second tactile feedback. FIGS. 5B and 5C are a bottom view and a partial cross-sectional view showing the relative position of the adjustment mechanism 20 to the cover plate 10 when the keyswitch is at the status of FIG. 5A, respectively. As shown in FIG. 1A and FIG. 5A, when the adjustment mechanism 20 moves along the Y-axis direction to a second position in the Y-axis direction (e.g., the operation button 40 of the keyboard 1 moves toward the direction B), the extending arm 314 is located at a second position with respect to the moving path of the cam portion 352. As shown in FIGS. 5B and 5C, when the adjustment frame 210 is located at the second position, the distance between the left edge of the left positioning hole 214 and the center of the bolt hole 530 of the corresponding positioning block 50 (e.g. left positioning block) is d1', and the distance between the right edge of the right positioning hole 214 and the center of the bolt hole 530 of the corresponding positioning block 50 (e.g. right positioning block) is d2'. In this embodiment, the distance d1' is smaller than the distance d1 the distance d2' is larger than the distance d2, and the difference between d1 and d1' (or between d2 and d2') is the distance that the adjustment frame 210 moves toward the direction B. In other words, the adjustment frame 210 moves toward the direction B along the Y-axis direction, so that the adjustment portion 220 pushes the extending arm 314 to move toward the outer side of the lower casing 330, and the position of the extending arm 314 relative to the moving path of the cam portion 352 in the Y-axis direction is changed. Accordingly, the pressing force required for the cam portion 352 moving across the extending arm 314 when the plunger 350 moves toward the lower casing 330 is changed, and the second tactile feedback of different pressing force is provided. For example, when the adjustment frame 220 is located at the second position, according to the distance that the adjustment frame 210 moves toward the direction B, the position of the extending arm 314 relative to the moving path of the cam portion 352 can be selectively located at one of the following positions in the Y-axis direction: (1) at a position that the extending arm 314 is closer to the protrudent point 3523 of the cam portion 352 and extends across the moving path of the cam portion 352, i.e., the adjustment portion 220 pushes the extending arm 314 outward along the Y-axis direction toward the outer side of the lower casing 330, so that the default stress of the positioning portion 312 and the extending arm 314 is increased, and when the plunger 350 as well as the cam portion 352 moves downward, the cam portion 352 will interfere with the extending arm 314 to provide the second tactile feedback of the second pressing force, which is different from the first pressing force, and the second sound distance is smaller than the first sound distance, and the second sound generated when the extending arm 314 hits the impact portion 304 is smaller, (2) at a position that the extending arm 314 substantially corresponds to the protrudent point 3523 of the cam portion 352 with respect to the moving path of the cam portion 352, and the default stress of the positioning portion 312 and the extending arm 314 can allow the cam portion 131 to push the extending arm 314 laterally away from the moving path when the plunger 350 as well as the cam portion 352 moves downward, so that the extending arm 314 moves laterally without bouncing upward to hit the impact portion 304 to provide the dome-collapse-like tactile feedback, or (3) a position that the extending arm 314 is located outside the moving path of the cam portion 352, so that the cam portion 352 does not interfere with the extending arm 314 when the plunger 350 as well as the cam portion 352 moves downward to provide a soundless linear feedback. In other words, according to the moving distance of the adjustment frame 210 toward the B direction, the adjustment portion 220 drives the extending arm 314 to move along the Y-axis direction to provide a tactile feedback different from the tactile feedback of FIG. 4A, such as different required pressing forces, dome-collapse-like tactile feedback, linear feedback. For example, in the embodiment of FIG. 5A, when the adjustment portion 220 is located at the second positioned in the Y-axis direction, the extending arm 314 is shifted outside the moving path of the cam portion 352, so that the cam portion 352 does not interfere with the extending arm 314 when the plunger 350 as well as the cam portion 352 moves downward to provide a soundless linear feedback.

It is noted that in the above embodiment, the operation button 40 is illustrated to move the adjustment mechanism 20 along the Y-axis direction from the first position toward the B direction to the second position, but not limited thereto. In another embodiment, the user may control the operation button 40 to move the adjustment mechanism 20 along the Y-axis direction from the second position toward the A direction to the first position, so as to change the tactile feedback. In addition, although two positions (e.g. first position and second position) are illustrated, according to practical applications, the adjustment mechanism 20 can move to be positioned at two or more positions, so as to provide two or more kinds of tactile feedback for the user to select.

Figure 6:
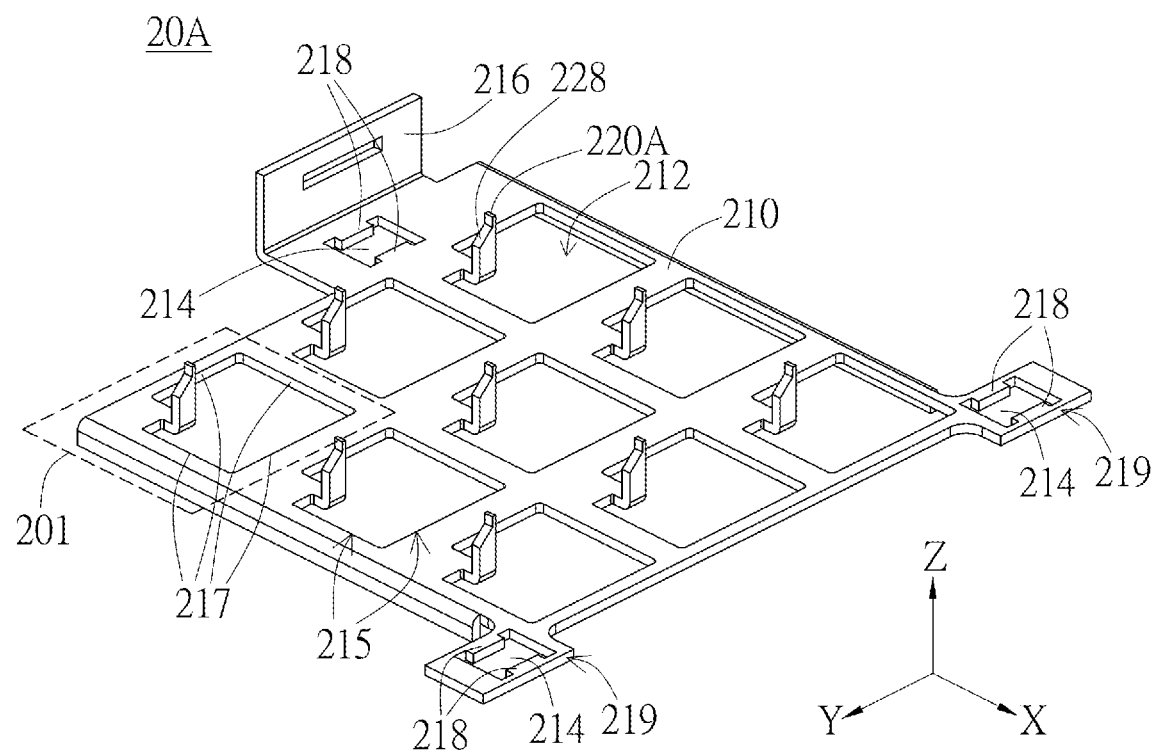
FIG. 6 is a schematic view of the adjustment mechanism of another embodiment of the invention.

In another embodiment, by changing the design of the adjustment portion 220 and the lower casing 330, the keyswitch can provide different tactile feedback. FIG. 6 is a schematic view of the adjustment mechanism 20A of another embodiment of the invention. In this embodiment, the difference between the adjustment mechanisms 20A and 20 is the adjustment portion 220A of the adjustment mechanism 20A has a first inclined surface 228. Specifically, as shown in FIG. 6, the first inclined surface 228 is preferably disposed on the upper portion of the vertical section 224. The first inclined surface 228 is disposed corresponding to the extending arm 314 and inclined downwardly toward the extending arm 314. When the adjustment frame 210 moves relative to the cover plate 10, the extending arm 314 moves along the first inclined surface 228 to change a horizontal distance and a vertical distance between the extending arm 314 and the cam portion 352.

Figure 7A:
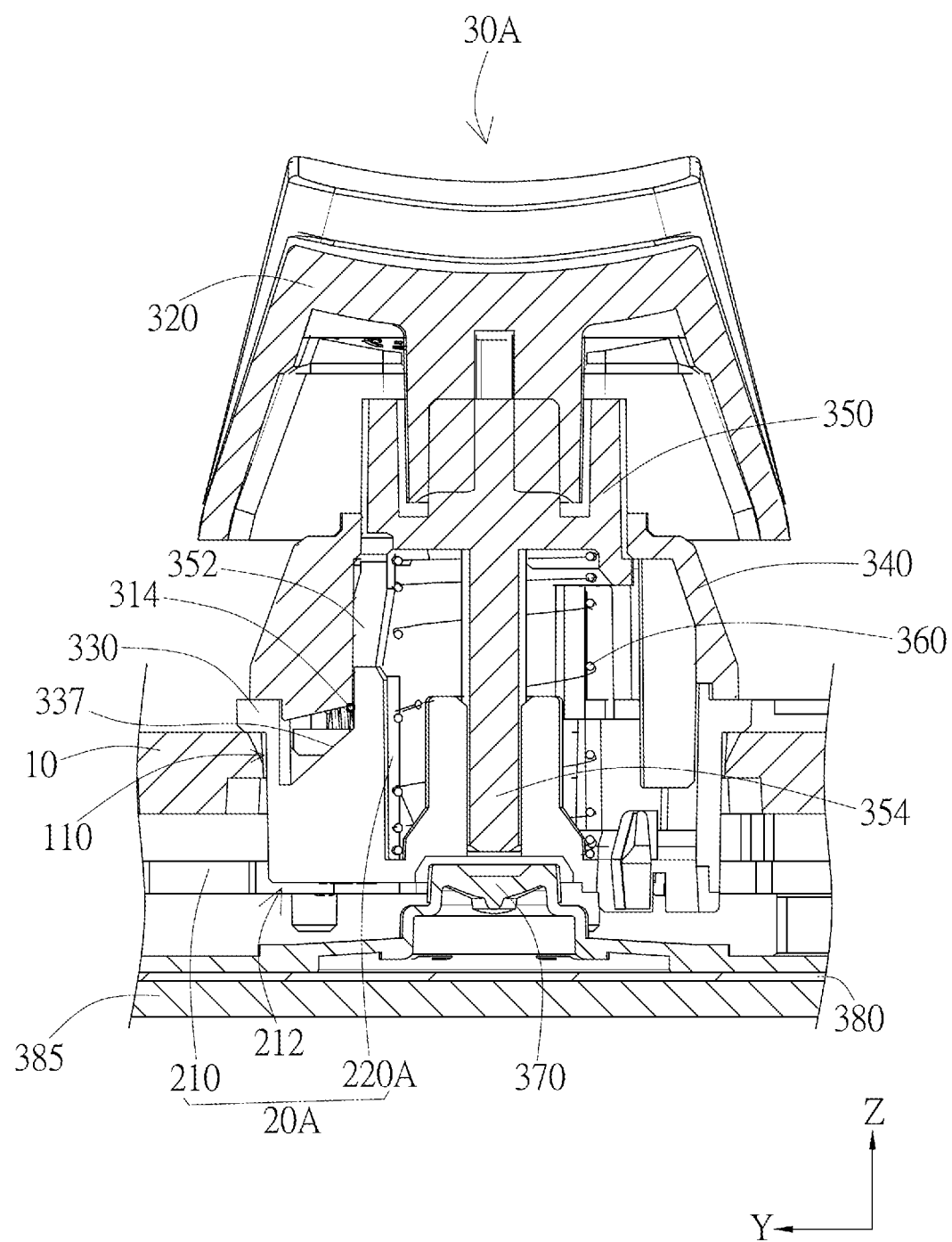
FIG. 7A is a cross-sectional view showing the keyswitch of the keyboard incorporated with the adjustment mechanism of FIG. 6 to provide the first tactile feedback.
Figure 7B:
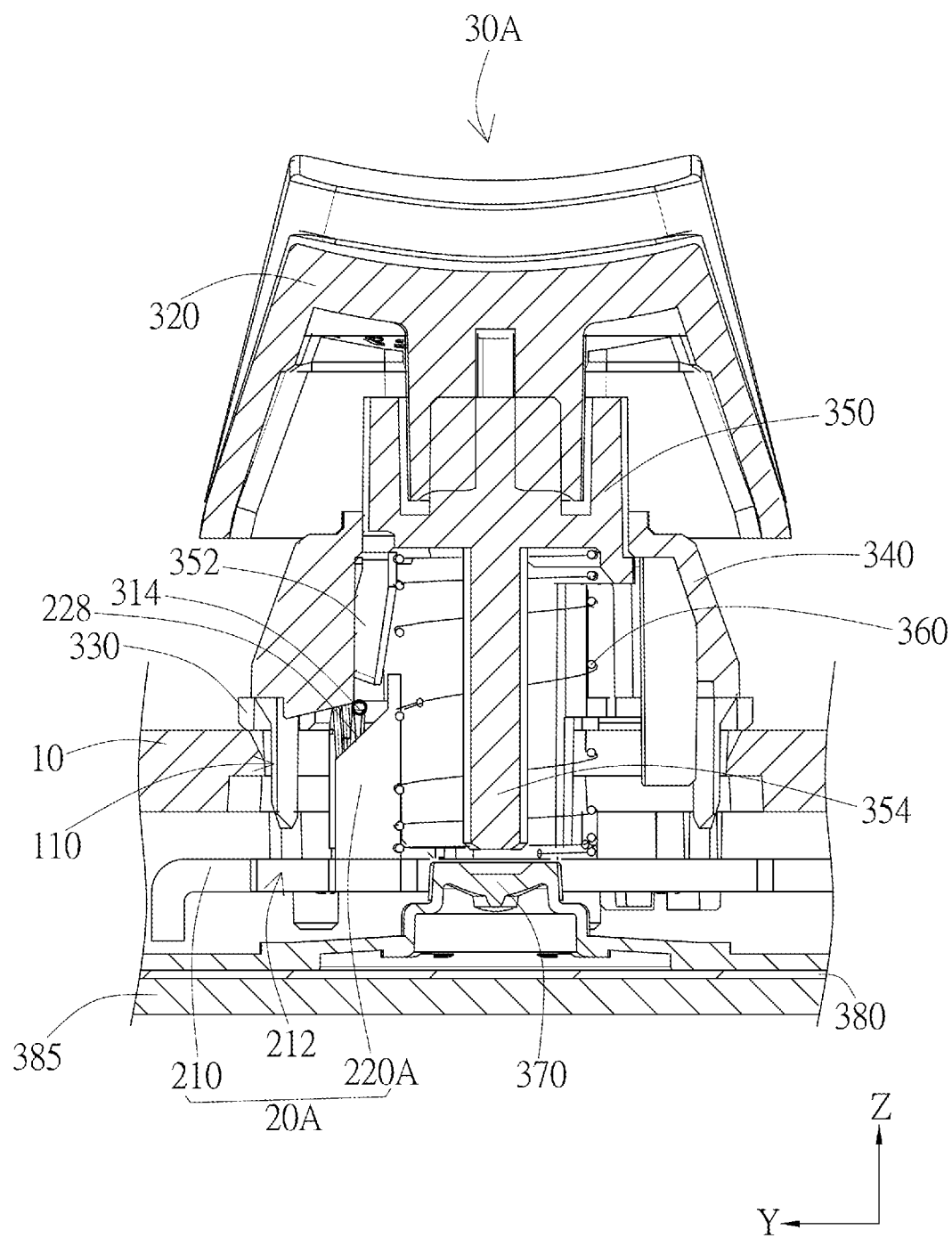
FIG. 7B is a cross-sectional view showing the keyswitch of FIG. 7A without the lower casing.

Referring to FIGS. 7A and 7B, an embodiment of the keyswitch 30A which is incorporated with the adjustment mechanism 20A is illustrated. Hereinafter, the difference of the keyswitches 30A and 30 will be illustrated, and the details of components of the keyswitch 30A can be referred to the related descriptions of the keyswitch 30 and will not elaborated again. FIG. 7A is a cross-sectional view showing the keyswitch 30A providing the first tactile feedback, and FIG. 7B is a cross-sectional view showing the keyswitch 30A of FIG. 7A without the lower casing 330. As shown in FIGS. 7A and 7B, the lower casing 330 has a second inclined surface 337. When the adjustment frame 210 moves relative to the cover plate 10, the extending arm 314 selectively comes in contact with the first inclined surface 228 or the second inclined surface 337. The vertical distance between the first inclined surface 228 and the cam portion 352 is different from the vertical distance between the second inclined surface 337 and the cam portion 352. For example, the second inclined surface 337 of the lower casing 330 can be a protruding surface inclined upward from the sidewall of the lower casing 330 toward the accommodating space 336, or an inclined surface of the top of a post, which is arranged in the accommodating space 336 and protrudes upward from the bottom. The second inclined surface 337 of the lower casing 330 and the first inclined surface 228 of the adjustment portion 220 preferably have a same inclined angle, and in the Z-axis direction, the position of the first inclined surface 228 is preferably higher than that of the second inclined surface 337, i.e., the first inclined surface 228 is closer to the cam portion 352 than the second inclined surface 337 is. As such, when the adjustment frame 210 of the adjustment mechanism 20A moves along the Y-axis direction, the extending arm 314 can selectively come in contact with the first inclined surface 228 or the second inclined surface 337, so that the relative distances between the extending arm 314 and the cam portion 352 in the Z-axis direction and the Y-axis direction can be changed.

Hereinafter, the tactile feedback adjustment of the keyswitches 30A in the keyboard by using the adjustment mechanism 20A will be illustrated. FIGS. 7A and 7B are cross-sectional views of the keyswitch 30A with/without the lower casing 330 for providing the first tactile feedback, respectively. As shown in FIGS. 7A and 7B, when the adjustment mechanism 20A is located at the first position (e.g., the operation button 40 of the keyboard moves toward the direction A), the adjustment portion 220 is farther away from the extending arm 314 than the second inclined surface 337 of the lower casing 330 is, i.e., the adjustment portion 220 is closer to the center of the accommodation space 336 than the second inclined surface 337, so that the extending arm 314 comes in contact with the second inclined surface 337 of the lower casing 330. In other words, the extending arm 314 is positioned at a first position in the Y-axis direction with respect to the moving path of the cam portion 352, i.e., the extending arm 314 has a first horizontal distance from the protrudent point 3523 of the cam portion 352 in the Y-axis direction and a first vertical distance from the protrudent point 3523 in the Z-axis direction. In this embodiment, when the adjustment frame 210 is located at the first position in the Y-axis direction, the extending arm 314 preferably extends across the moving path of the cam portion 352, and the pressing force required for the cam portion 352 moving toward the lower casing 330 and passing the extending arm 314 is a first pressing force. In other words, when the adjustment mechanism 210 is located at the first position in the Y-axis direction, the extending arm 314 is located in the moving path of the cam portion 352, so that the cam portion 352 will interfere with the extending arm 314 when moving downward to provide the first tactile feedback. Specifically, when the adjustment frame 210 is located at the first position in the Y-axis direction, and the first pressing force is applied to the keycap 320, the keycap 320 drives the plunger 350 to move toward the lower casing 330 by the first vertical distance, the cam portion 352 presses the extending arm 314 to enable the extending arm 314 to firstly move downward along the second inclined surface 337 of the lower casing 330 and along the lower surface 3521 to the protrudent point 3523, and then pass the protrudent point 3523 to move upward to provide the first tactile feedback. It is noted that when the extending arm 314 reaches the protrudent point 3523, the extending arm 314 has a first sound distance from an impact surface of the lower casing 330 or the upper casing 340, and then, the extending arm 314 hits the impact surface to generate a sound, such as a first sound. In this embodiment, the impact surface can be a wall surface of the upper casing 340 or the lower casing 330 that corresponds to the extending arm 314, such as the impact surface of the impact portion 304 of the lower casing 330.

Figure 8A:
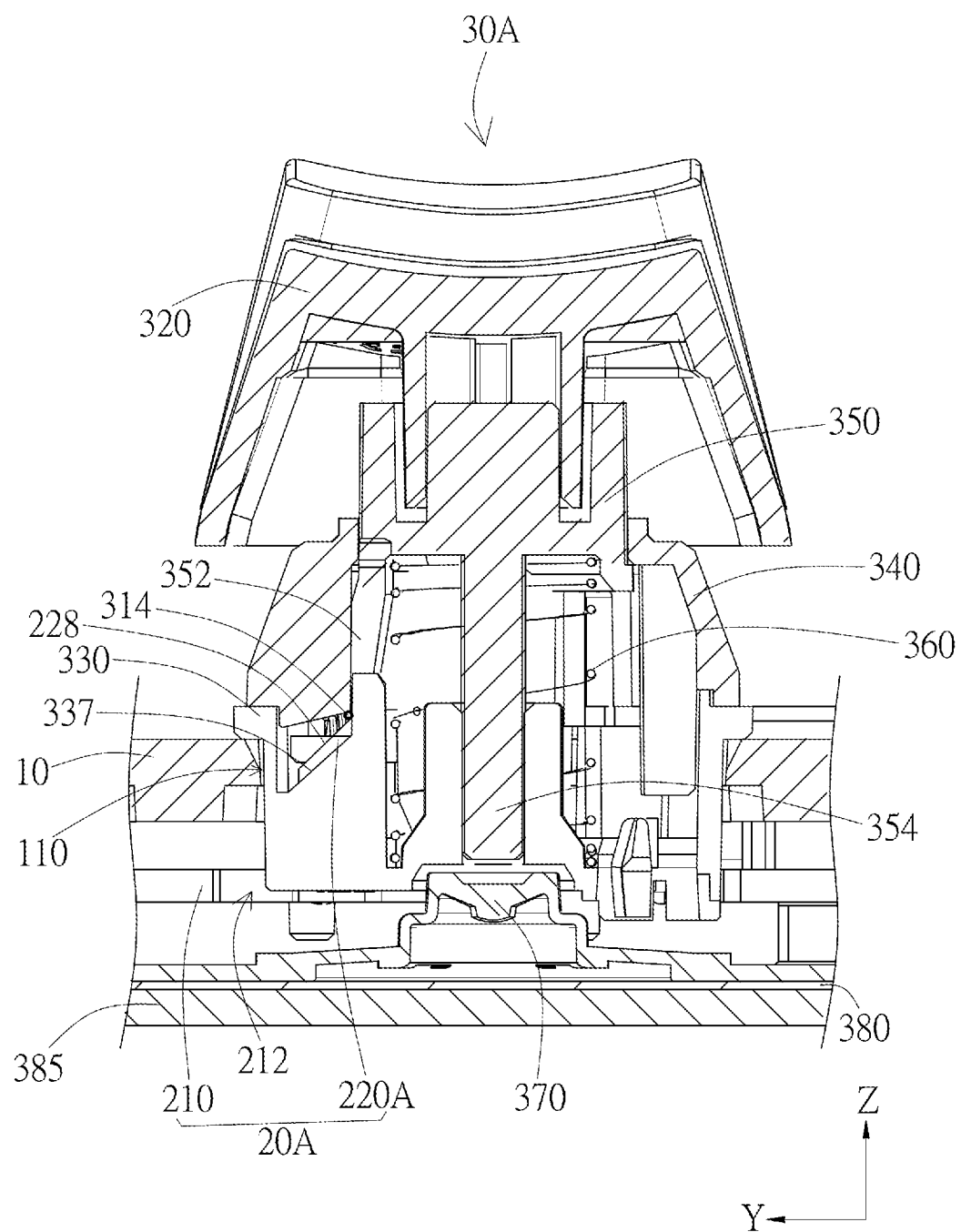
FIG. 8A is a cross-sectional view showing the keyswitch of the keyboard incorporated with the adjustment mechanism of FIG. 6 to provide the second tactile feedback.
Figure 8B:
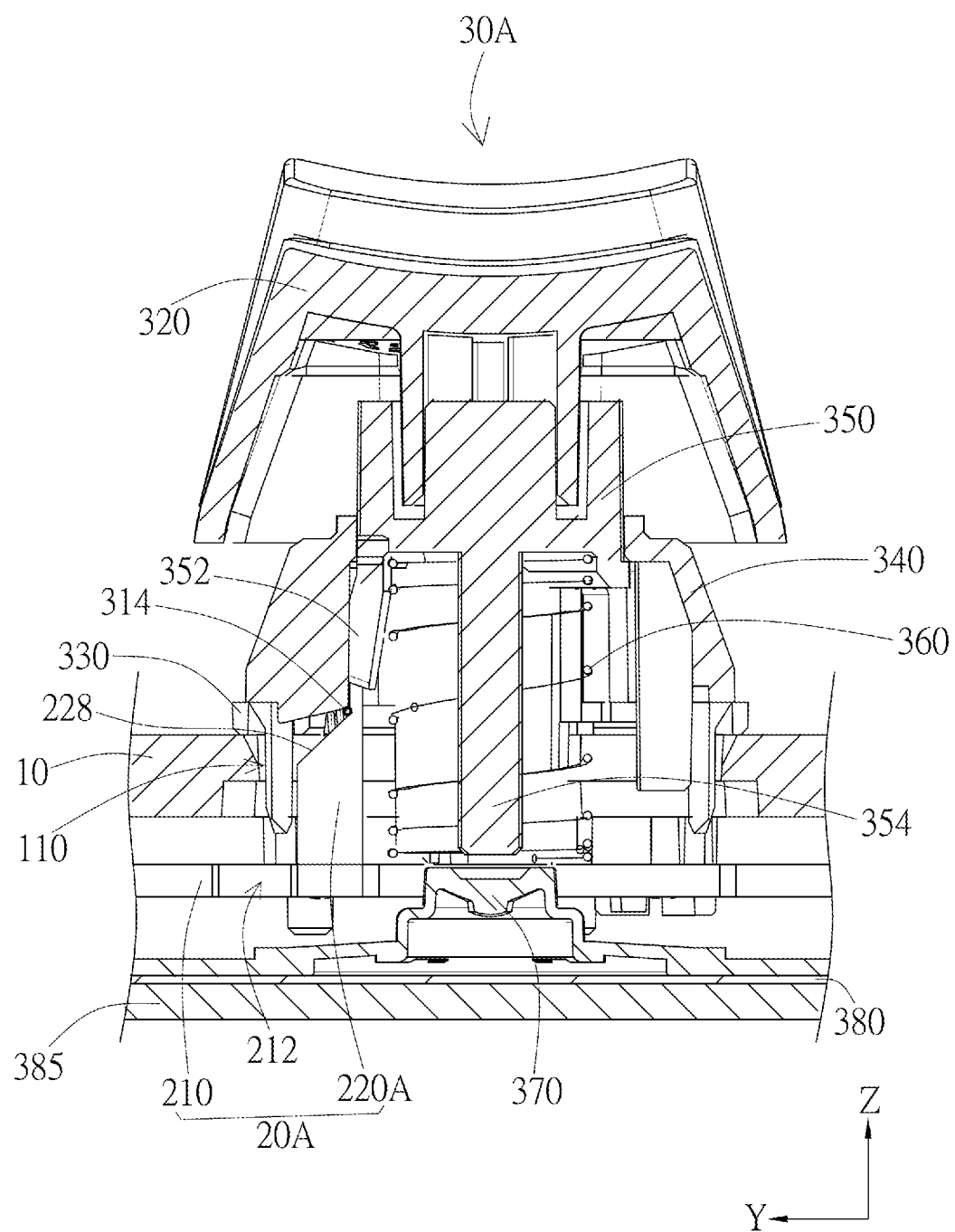
FIG. 8B is a cross-sectional view showing the keyswitch of FIG. 8A without the lower casing.

FIGS. 8A and 8B are cross-sectional views of the keyswitch 30A with/without the lower casing 330 for providing the second tactile feedback, respectively. As shown in FIGS. 8A and 8B, the adjustment mechanism 20A moves along the Y-axis direction to the second position (e.g., the operation button 40 of the keyboard moves toward the direction B), and the extending arm 314 comes in contact with the first inclined surface 228 of the adjustment portion 220. In other words, the extending arm 314 is located at the second position in the Y-axis direction with respect to the moving path of the cam portion 352, i.e., the extending arm 314 has the second horizontal distance from the protrudent point 3523 of the cam portion 352 in the Y-axis direction and the second vertical distance from the cam portion 353 in the Z-axis direction. In this embodiment, since the first inclined surface 228 of the adjustment portion 220 is higher than the second inclined surface 337 of the lower casing 330, the second vertical distance is smaller than the first vertical distance, and the second horizontal distance can be smaller than or equal to the first horizontal distance. In other words, when the adjustment portion 220 is located at the second position in the Y-axis direction, i.e., the extending arm 314 is in contact with the first inclined surface 228, the stroke point that produces the tactile feedback is earlier than when it is located at the first position, i.e., the user receives the tactile feedback earlier.

Moreover, according to the moving distance of the adjustment frame 210 along the Y-axis direction, the keyswitches 30A can provide different tactile feedbacks, such as different required pressing forces, dome-collapse-like tactile feedback, linear feedback, as described above. Specifically, in the embodiment of FIG. 7A, the lower casing 330 is illustrated with the second inclined surface 337. However, in other embodiments, the lower casing 330 may not have the second inclined surface, and the extending arm 314 is in contact with the first inclined surface 228, so that when the adjustment frame 210 moves, the extending arm 314 moves along the first inclined surface 228 to change the horizontal distance (in the Y-axis direction) and the vertical distance (in the Z-axis direction) between the extending arm 314 and the cam portion 342. For example, similar to the embodiment of FIG. 5A, when the extending arm 314 is in contact with the first inclined surface 228, the extending arm 314 can selectively contact different portions of the first inclined surface 228 (i.e., at different heights) according to the moving distance of the adjustment frame 210 toward the B direction, so that the position of the extending arm 314 relative to the cam portion 352 can be selectively located at one of the different positions in the Y-axis direction as described above. In other words, when the extending arm 314 contacts the first inclined surface 228, the keyswitch 30A can provide different kinds of tactile feedback according to the moving distance of the adjustment frame 210 toward the B direction, such as different required pressing forces, dome-collapse-like tactile feedback, linear feedback.

Figure 9A:
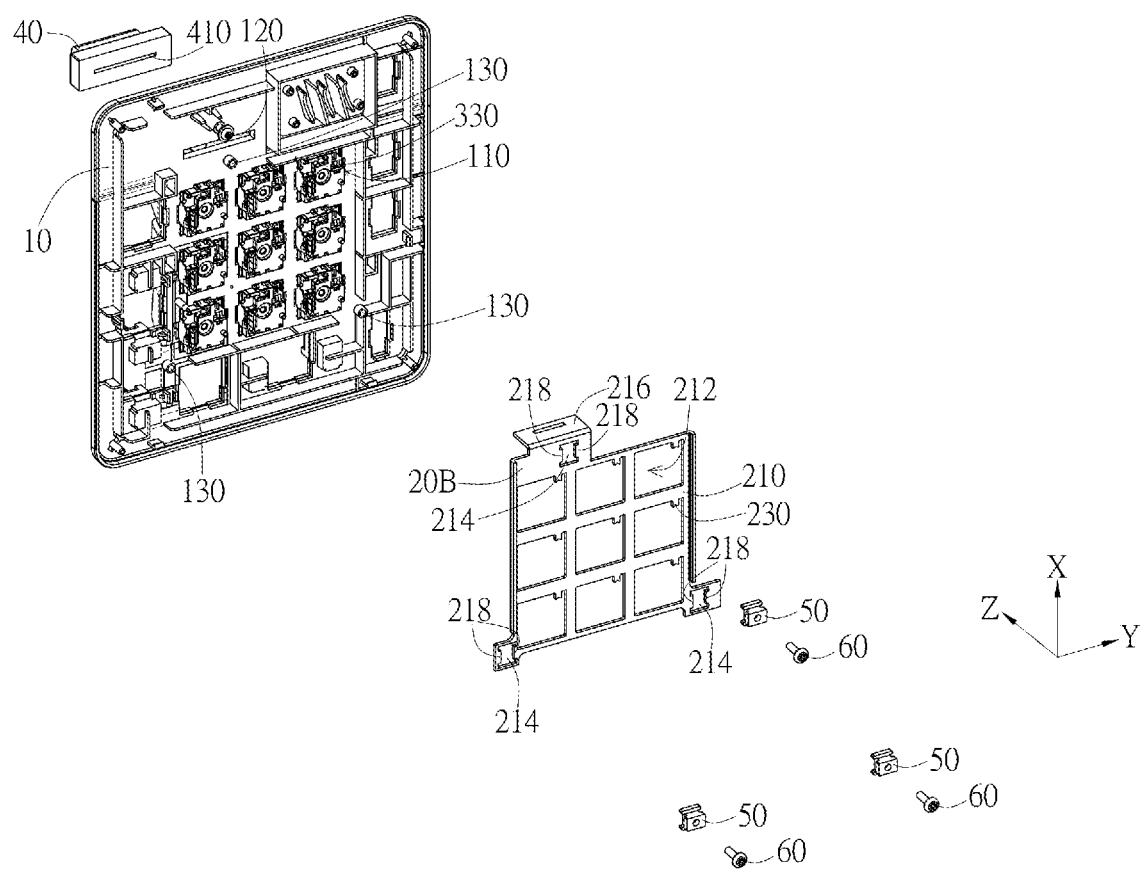
FIGS. 9A and 9B are an exploded view and an assembled view showing the adjustment mechanism positioned on the cover plate in another embodiment of the invention, respectively.
Figure 9B:
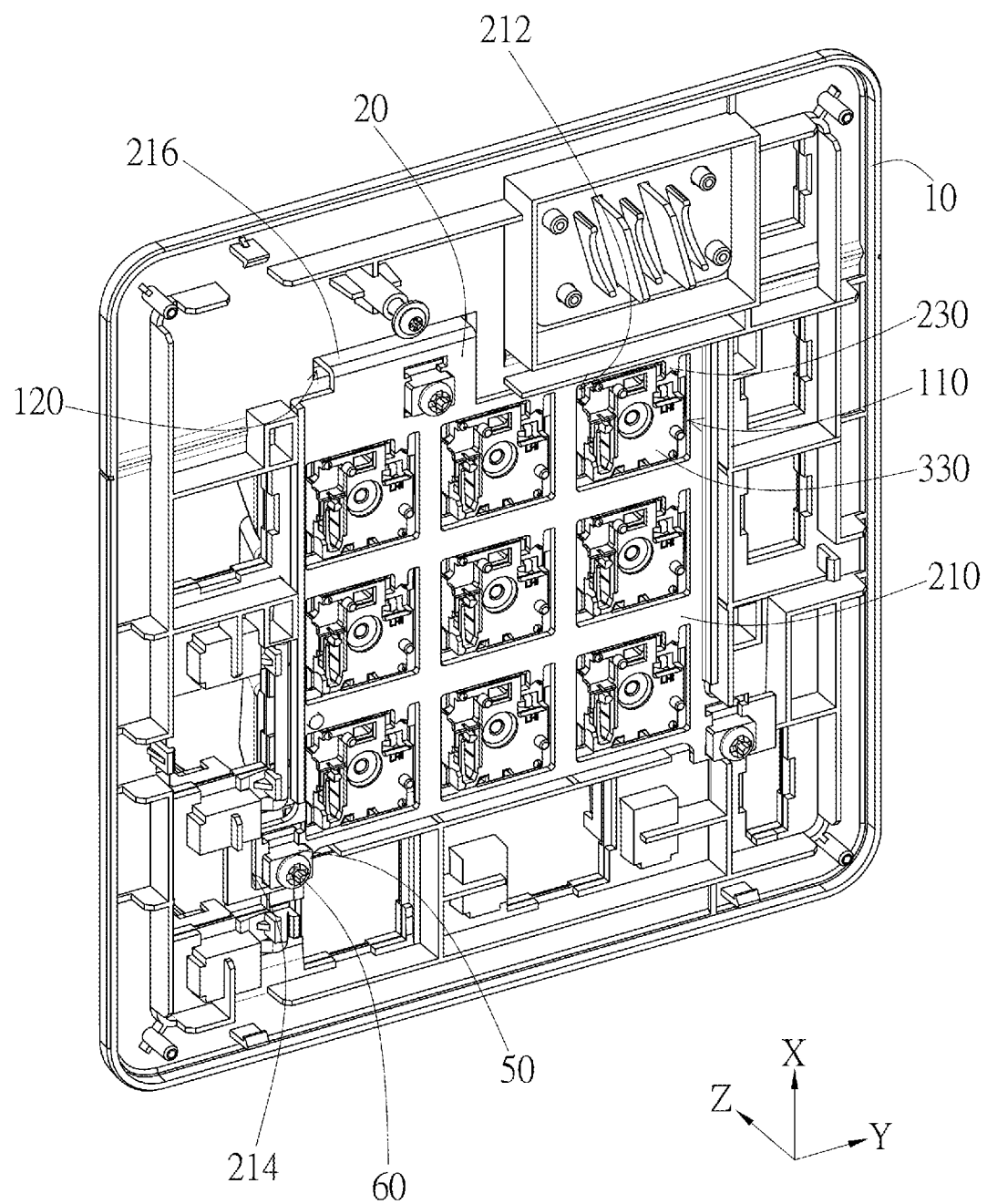
Figure 9C:
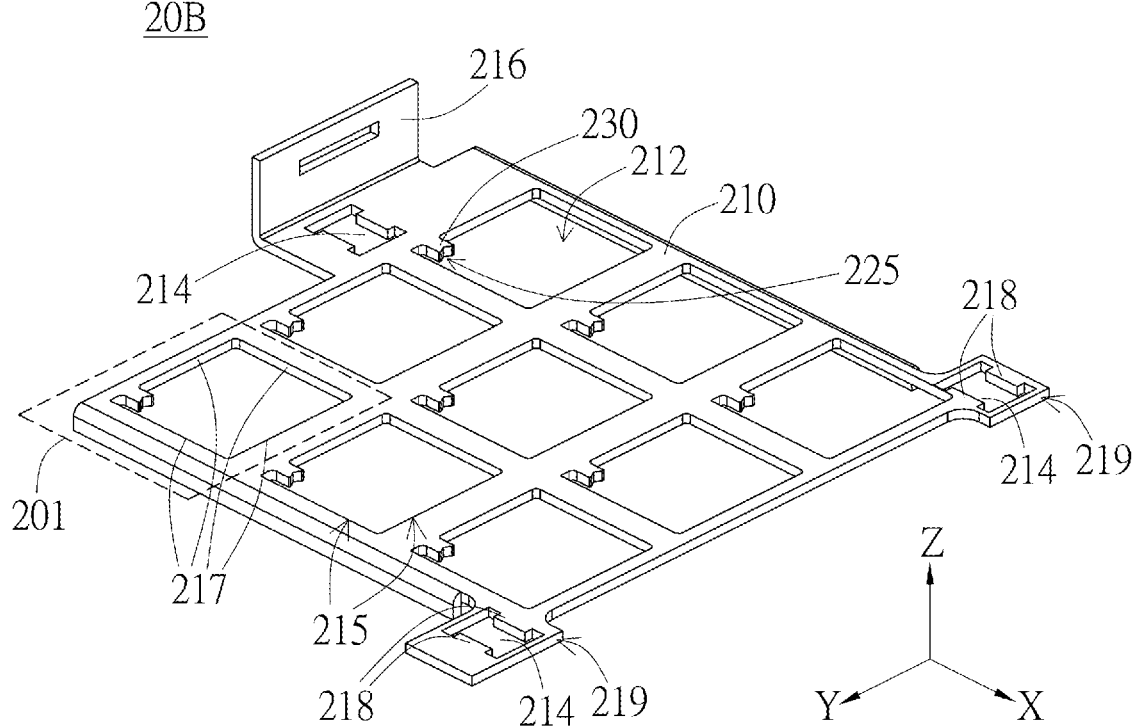
FIG. 9C is a schematic view of the adjustment mechanism of FIG. 9A.

In the above embodiments, the adjustment mechanism 20 or 20A changes the tactile feedback by using the adjustment portion 220 to adjust the position of the extending arm 314 of the tactile feedback member 310, but not limited thereto. In other embodiments, by modifying the design of the adjustment portion, the adjustment mechanism can change the tactile feedback by using the adjustment portion to adjust the position of the positioning portion 312 of the tactile feedback member 310. FIGS. 9A and 9B are an exploded view and an assembled view showing the adjustment mechanism 20B positioned on the cover plate 10 in another embodiment of the invention, respectively, and FIG. 9C is a schematic view of the adjustment mechanism 20B of FIG. 9A. As shown in FIGS. 9A to 9C, in this embodiment, the adjustment portion 230 extends horizontally from the edge of the second keyhole 212 of the adjustment frame 220 into the second keyhole 212, so as to correspond to the positioning portion 312. Specifically, the adjustment portion 230 is a protrusion, which extends from the ribs 215 (or sub-rib 217) horizontally along the X-axis direction toward the second keyhole 212. The adjustment portion 230 preferably has a length long enough to extend into the opening 333 from the lateral side of the lower casing 330 to correspond to the positioning portion 312 of the tactile feedback member 310. In an embodiment, the adjustment portion 230 preferably has a notch 225 at its free end. The notch 225 is formed by recessing the end surface of the adjustment portion 230 and preferably extends along the Z-axis direction to correspond to the longitudinal direction of the positioning portion 312, so as to enhance to linking effect of the adjustment portion 230 and the positioning portion 312, but not limited thereto. In another embodiment, the adjustment portion 230 may not have the notch 225, and the positioning portion 312 abuts against the end surface of the adjustment portion 230.

In this embodiment, the positioning hole 303 of the lower casing 330 is preferably an elongated through hole formed on the bottom of the lower casing 330 along the X-axis direction to allow the positioning portion 312 to shift in the positioning hole 303. Moreover, corresponding to the shift of the positioning portion 312 along the X-axis direction, the positioning hole 214 of the adjustment frame 210 is preferably an H-shaped through hole, which extends along the X-axis direction, so that the hole width of the positioning hole 214 in the Y-axis direction at two end portions arranged along the X-axis direction is larger than that at the middle portion, and the portion of the adjustment frame 210 defining the middle portion of the positioning hole 214 forms two wing portions 218, which extend toward each other in the X-axis direction. Moreover, in this embodiment, the positioning block 50 can have a structure similar or identical to that shown in FIG. 3A, but is disposed at a different orientation. For example, the positioning block 50 of FIG. 9A can be the positioning block 50 of FIG. 3A rotated by 90 degrees to correspond to the positioning hole 214 and the wing portions 218 extending along the X-axis direction. In other words, the extending directions of the positioning hole 214, the wing portions 218, and the adjustment portion 230 are substantially parallel to the X-axis direction, so that the adjustment mechanism 20B is movably positioned on the cover plate 10 in the X-axis direction by the clamping effect of the positioning block 50.

Moreover, in the embodiments of FIGS. 9A to 11, the adjustment portion 230 is illustrated to horizontally extend from the corresponding rib 215 toward the second keyhole 212, so as to extend into the opening 333 from the lateral side of the lower casing 330 to correspond to the positioning portion 312, but not limited thereto. In another embodiment (not shown), by modifying the design of the positioning portion 312 of the tactile feedback member 310, the positioning portion 312 can extend outward from the lateral side of the lower casing 330 to correspond to the rib 215, so that one or more ribs 215 adjacent to the second keyhole 212 can serve as the adjustment portion to drive the positioning portion 312 to shift, without additionally disposing the adjustment portion 230.

Figure 10:
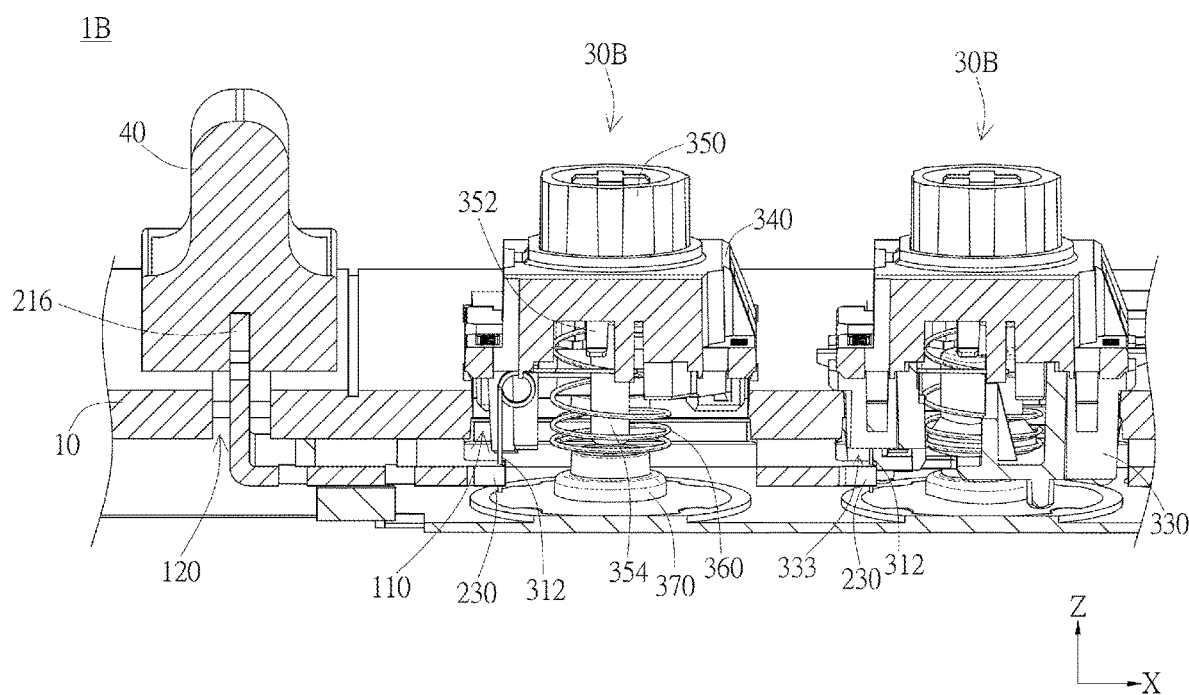
FIG. 10 is a cross-sectional view of the keyboard having the design of FIG. 9A to provide the first tactile feedback.
Figure 11:
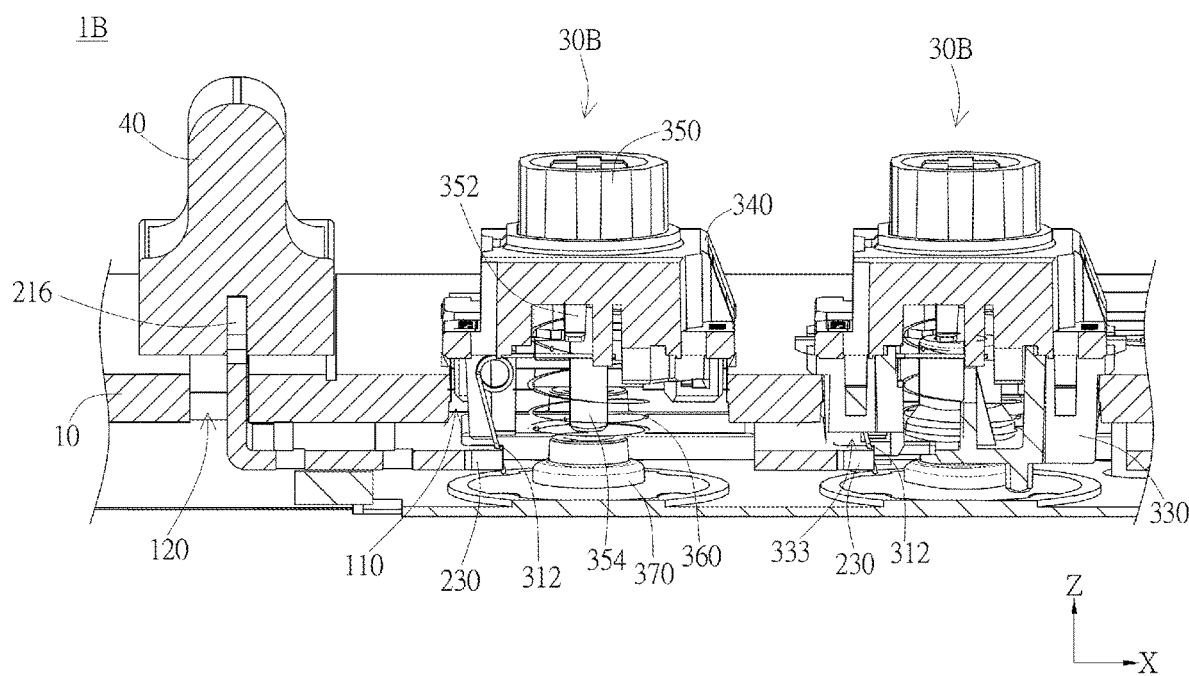
FIG. 11 is a cross-sectional view of the keyboard having the design of FIG. 9A to provide the second tactile feedback.

Hereinafter, the tactile feedback adjustment of the keyswitches 30B of keyboard 1B in the keyboard 1 by using the adjustment mechanism 20B will be illustrated. FIGS. 10 and 11 are cross-sectional views of the keyswitch 30B for providing the first tactile feedback and the second tactile feedback, respectively, wherein for the convenience of explanation, the keyswitch 30B at the left-hand side is illustrated without the lower casing 330. As shown in FIG. 10, when the tactile feedback member 310 is disposed in the lower casing 330, the spring body is received in the accommodation area 338, the positioning portion 312 is inserted into the positioning hole 303 and at least partially abuts against the adjustment portion 230 (e.g. at least partially inserted into the notch 225), and the extending arm 314 extends under the cam portion 352. In this embodiment, the adjustment frame 210 can move along the extending direction of the extending arm 314 (e.g. the X-axis direction), so as to change the deformation of the tactile feedback member 310 and in turn to change the default stress of the tactile feedback member 310. As shown in FIG. 11, when the adjustment frame 210 moves along the X-axis direction, the adjusting portion 230 drives the positioning portion 312 to shift relative to the positioning hole along the X-axis direction, so the positioning portion 312 and the extending arm 314 are changed in position relative to the spring body, i.e. the deformation is changed. In other words, the default stress of the spring is changed, so that the action of the cam portion 352 and the tactile feedback member 310 is correspondingly changed to provide a different tactile feedback, such as different required pressing forces, dome-collapse-like tactile feedback, or linear feedback.

For example, as shown in FIG. 10, the adjustment portion 230 abuts against the positioning portion 312 and is located at a first position in the X-axis direction, i.e., at a position where the distance that the adjustment portion 230 extends into the lower casing 330 from the opening 333 is smaller, and the tactile feedback member 310 has a first deformation. As such, the pressing force required for the cam portion 352 to pass the extending arm 314 is a first pressing force when the plunger 350 moves toward the lower casing 330 and drives the cam portion 352 to move. As shown in FIG. 11, the adjustment frame 210 moves along the X-axis direction, such as toward the bottom right of FIG. 1A, the adjustment portion 230 abuts against the positioning portion 312 and is located at a second position in the X-axis direction, i.e., at a position where the distance that the adjustment portion 230 extends into the lower casing 330 from the opening 333 is larger, and the tactile feedback member 310 has a second deformation. As such, the pressing force required for the cam portion 352 to pass the extending arm 314 is a second pressing force when the plunger 350 moves toward the lower casing 330 and drives the cam portion 352 to move. In other words, the second position of the adjustment portion 230 is a position closer to the cam portion 352, and the adjustment portion 230 inwardly pushes the positioning portion 312 toward the lower casing 330, so that the default stress of the tactile feedback member 310 is increased.

Specifically, when the adjustment portion 230 moves in the X-axis direction toward the cam portion 352 by different distances, different deformations of the tactile feedback member 310 can selectively enable that: (1) the torsion spring has different default stresses so as to provide different kinds of tactile feedback of different resistant forces with sounds of different volumes, (2) when the default stress reaches a certain degree, the cam portion 352 pushes the extending arm 314 laterally away from the moving path to provide the dome-collapse-like tactile feedback, or (3) the extending arm 314 is outside the moving path of the cam portion 352, so that a soundless linear feedback can be provided. According to practical applications, two or more kinds of tactile feedback can be provided by controlling the moving distance of the adjustment frame 210 in the X-axis direction.

Figure 12A:
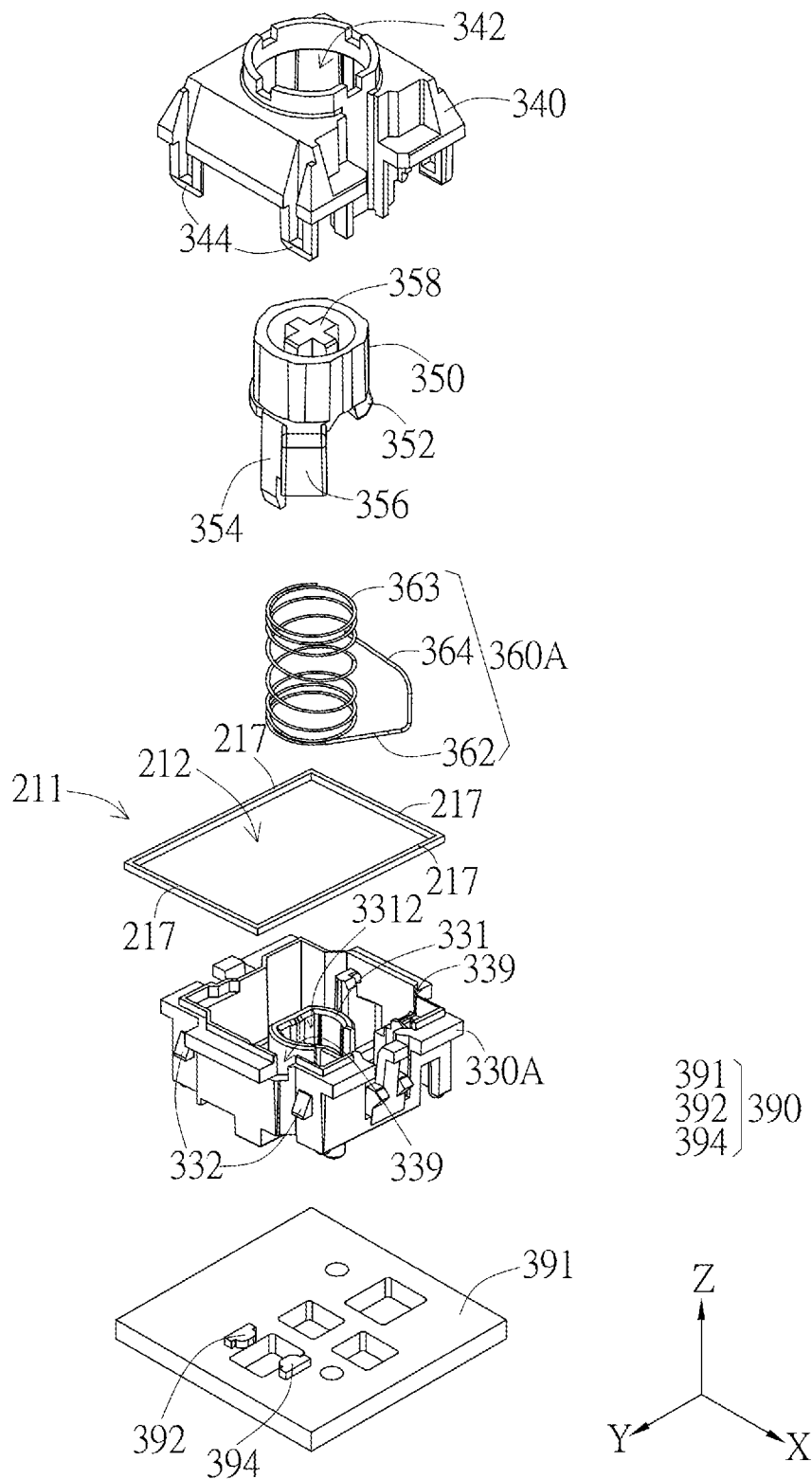
FIG. 12A is an exploded view of the keyswitch in another embodiment of the invention.
Figure 12B:
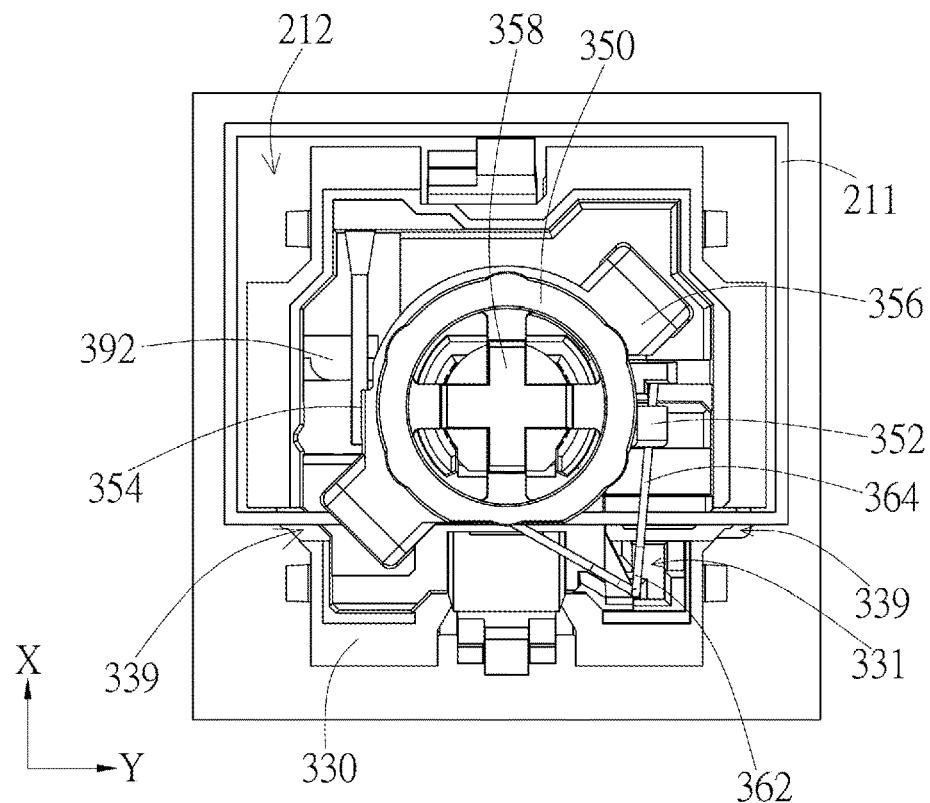
FIG. 12B is a top view of the keyswitch of FIG. 12A without the upper casing.

Moreover, in the above embodiments, the size of the second keyhole 212 of the adjustment frame 210 substantially corresponds to the size of the lower casing 330, so that the lower portion of the lower casing 330 at least partially extends into the second keyhole 212, i.e., the sub-ribs of each keyswitch surround the outer periphery of the lower casing 330, but not limited thereto. FIGS. 12A and 12B are an exploded view and a top view of the keyswitch 30C without the upper casing 340 in another embodiment, respectively. As shown in FIGS. 12A and 12B, in this embodiment, the components of the keyswitch 30C, such as the upper casing 340, the lower casing 330, the plunger 350, are similar to those in the embodiment of FIG. 3A, and the details thereof can be referred to the above related descriptions and will not elaborated again. Hereinafter, the difference of the keyswitches 30C and 30 will be illustrated.

Specifically, in the above embodiments, the restoring member 360 and the tactile feedback member 310 are separate components, but not limited thereto. In this embodiment, the restoring member 360 and the tactile feedback member 310 can be integrated into an integral single component. As shown in FIG. 12A, the spring type restoring member and the tactile feedback member can be integrated into a composite resilient member 360A. In this embodiment, the composite resilient member 360A includes a spring portion 363, a positioning portion 362, and an extending arm 364. The spring portion 363 is embodied in the form of a spring similar to the restoring member 360 of FIG. 3A and configured to provide a restoring force to enable the plunger 350 to move along a direction away from the lower casing 330. The positioning portion 362 is connected to the spring portion 363 and the extending arm 364. The positioning portion 362 is positioned in the positioning hole 303 of the lower casing 330, and the extending arm 364 extends corresponding to the cam portion 352. Specifically, the positioning portion 362 and the extending arm 364 are preferably formed by bending a rod body, which extends from one end of the spring portion 363, such as the lower end, so that the positioning portion 362 and the extending arm 364 can function as the tactile feedback member of the keyswitch 30C.

As shown in FIG. 12A, the keyswitch 30C includes a switch unit 390, which includes an emitter 392 and a receiver 394 electrically connected to a circuit board 391. For example the emitter 392 and the receiver 394 can be disposed at two opposite sides along the X-axis direction under the actuating portion 354. As such, when the keycap 320 is pressed to push the plunger 350 to move toward the lower casing 330, the keyswitch 30C can generate a triggering signal by changing the amount of light received by the receiver 394 from the emitter 392. According to practical applications, the lower casing 330 can be positioned on the circuit board by positioning mechanisms, such as hole and stud, so that the lower casing may be provided with or without the bearing portion 334 mentioned above.

In this embodiment, the adjustment unit 211 includes a plurality of sub-ribs 217, and the plurality of sub-ribs 217 enclose the second keyhole 212, which allows a portion of the lower casing 330 to extend thereinto, so that the adjustment unit 211 of each keyswitch 30C partially surrounds the outer lateral side of the lower casing 330 and partially extends into the lower casing 330 to serve as adjustment portion 220, which is configured to drive the tactile feedback member to locally deform. For a single keyswitch 30C, the adjustment portion 220 can be a portion of the frame body of the adjustment unit 211, such as the sub-rib 217, and for the entire keyboard (e.g. 10 shown in FIG. 16), the sub-ribs 217 of the adjustment units 211 of the plurality of keyswitches 30C are connected to each other to from the plurality of ribs 215, so as to define a plurality of second keyholes 212 of the adjustment mechanism 20C. As such, one or more ribs 215 (or sub-ribs 217) adjacent to the second keyhole 212 can serve as the adjustment portion 220. In this embodiment, the lower casing 330 preferably has a channel 339. The channel 339 is formed by recessing a portion of the lower casing 330 from the upper surface, so that a portion of the adjustment unit 211 (or the sub-rib 217) can extend into the accommodation space 336 through the channel 339 to correspond to the extending arm 364. For example, the channel 339 is formed in the top portion of two opposite sidewalls of the lower casing 330 along the Y-axis direction, so that one of the ribs of the adjustment unit 211 extending along the Y-axis direction can extend into the lower casing 330 through the channel 339 to run across below the extending arm 364. As such, the upper portion of the lower casing 330 is partially located within the second keyhole 212, so as to reduce the space required for accommodating the adjustment frame 210 (or the adjustment unit) in the thickness direction (e.g. Z-axis direction), to effectively improve the thinning effect of the keyboard or the keyswitch.

Figure 12C:
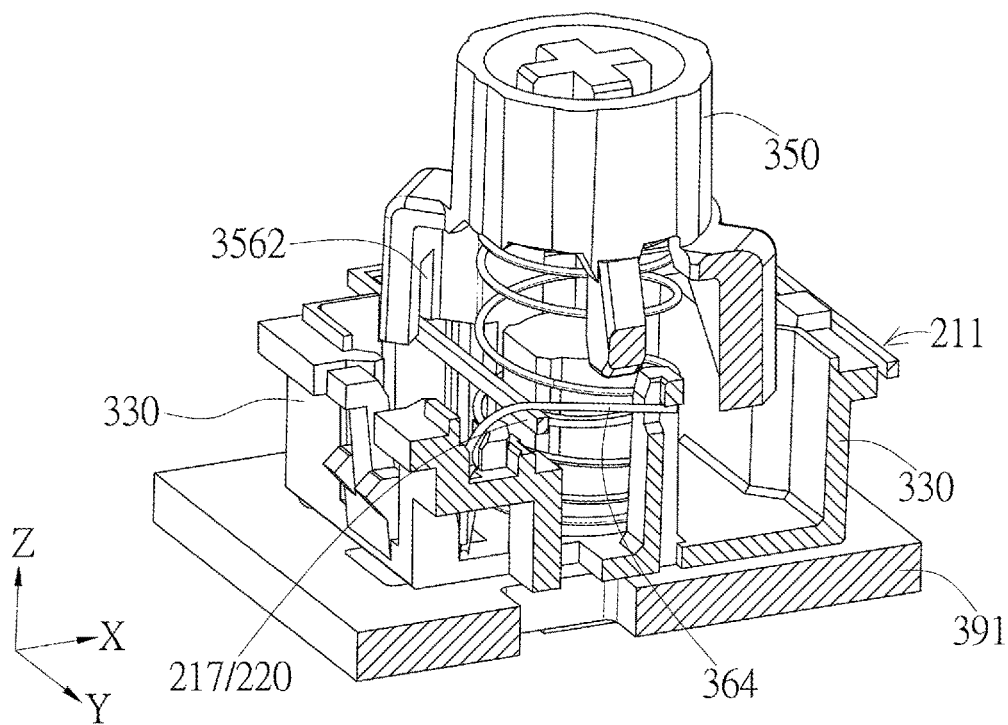
FIG. 12C is a partially cutout view of the keyswitch of FIG. 12A.

Referring to FIG. 12C, the tactile feedback adjustment of the keyswitch 30C will be described, wherein FIG. 12C is a partially cutout view of the keyswitch 30C of FIG. 12A. As shown in FIG. 12C, the adjustment unit 211 is partially received in the channel 339, so that the portion of the frame body (e.g. the sub-rib 217) running across below the extending arm 364 serves as the adjustment portion 220. In other words, the adjustment portion 220 is the sub-rib 217 of the adjustment unit 211 that is located between the upper casing 340 and the lower casing 330. By controlling the adjustment unit 211 to move in the channel 339 in a direction close to or away from the upper casing 340, the extending arm 364 is deformed, and the position of the extending arm 364 relative to the cam portion 352 in a direction parallel to the moving path can be changed, so that the keyswitch 30C can provide the tactile feedback with different stroke point. In other words, by controlling the movement of the adjustment unit 211 in the Z-axis direction, the vertical distance between the extending arm 364 and the cam portion 352 in the Z-axis direction can be changed to provide the tactile feedback with different stroke points.

Figure 13:
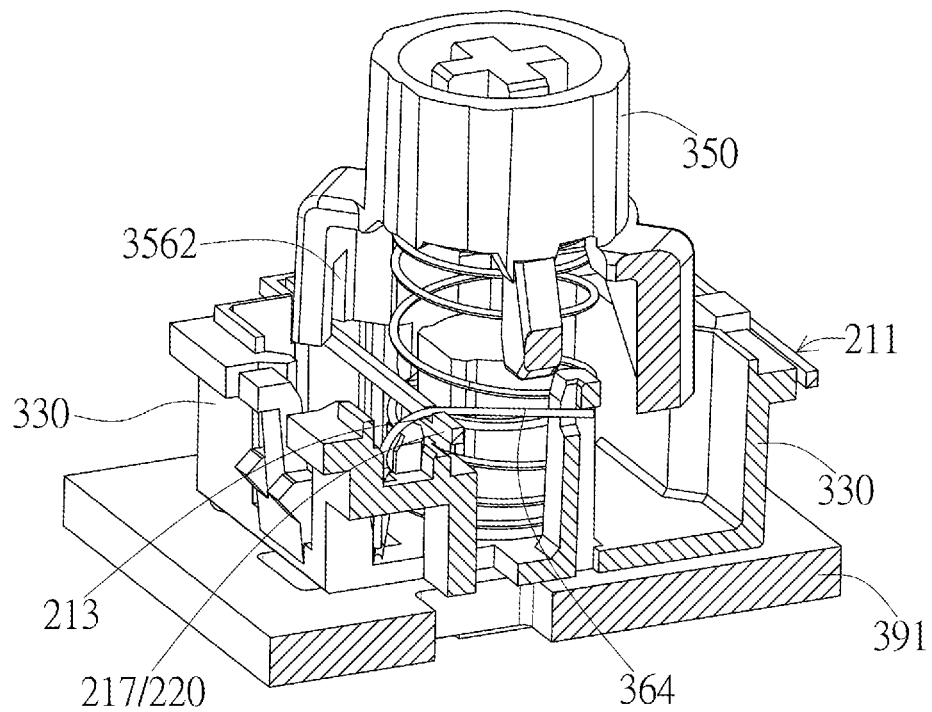
FIG. 13 is a schematic view of a variant embodiment of the adjustment unit of FIG. 12A.

FIG. 13 is a schematic view of a variant embodiment of the adjustment unit 211 of FIG. 12A. As shown in FIG. 13, the adjustment unit 211 has a groove 213 in the sub-rib 217 that corresponds to the extending arm 364, so that the extending arm 364 can extend through the groove 213. Specifically, the extending direction of the groove 213 is substantially parallel to the extending direction of the extending arm 364, and the extending arm 364 extends across the sub-rib 217 in the groove 213 along the X-axis direction to enhance the linking effect of the adjustment portion 220 and the extending arm 364.

Figure 14:
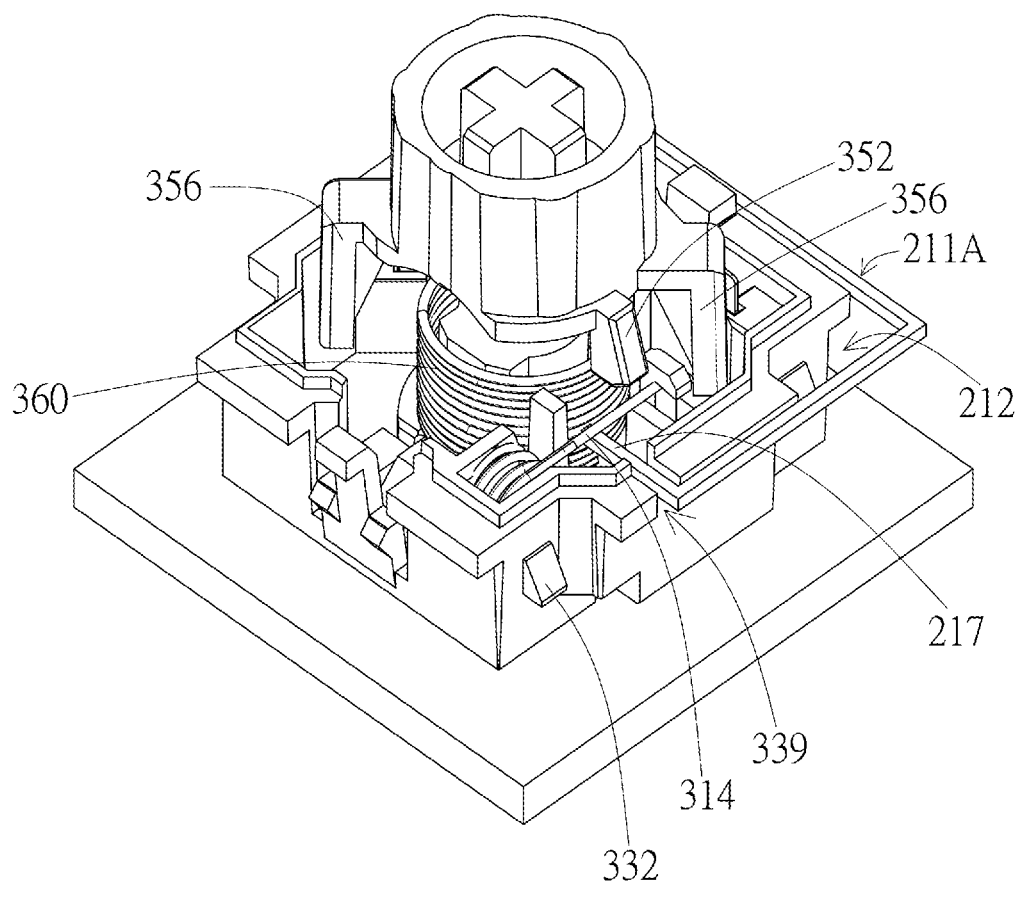
FIG. 14 is a schematic view of another variant embodiment of the adjustment unit of FIG. 12A.

FIG. 14 is a schematic view of another variant embodiment of the adjustment unit 211 of FIG. 12A. In the case that the adjustment unit 211 of FIG. 12A is a closed frame, the adjustment unit 211A of FIG. 14 can be an opened frame. Specifically, in this embodiment, the sub-ribs 217 can be connected to each other to form an "n-shaped" frame, and the second keyhole 212 defined by the sub-ribs 217 can be an open space. The adjustment unit 211A merely surrounds a portion of the outer periphery at the lateral side of the lower casing 330, so that one end of the adjustment unit 211A (e.g. the free end of the sub-rib 217) extends into the lower casing 330 to correspond to the extending arm 364 as the adjustment portion 220. Corresponding to the open frame configuration of the adjustment unit 211A, the lower casing 330 may have only one channel 339 to allow the adjustment portion 220 to extend therethrough.

Figure 15:
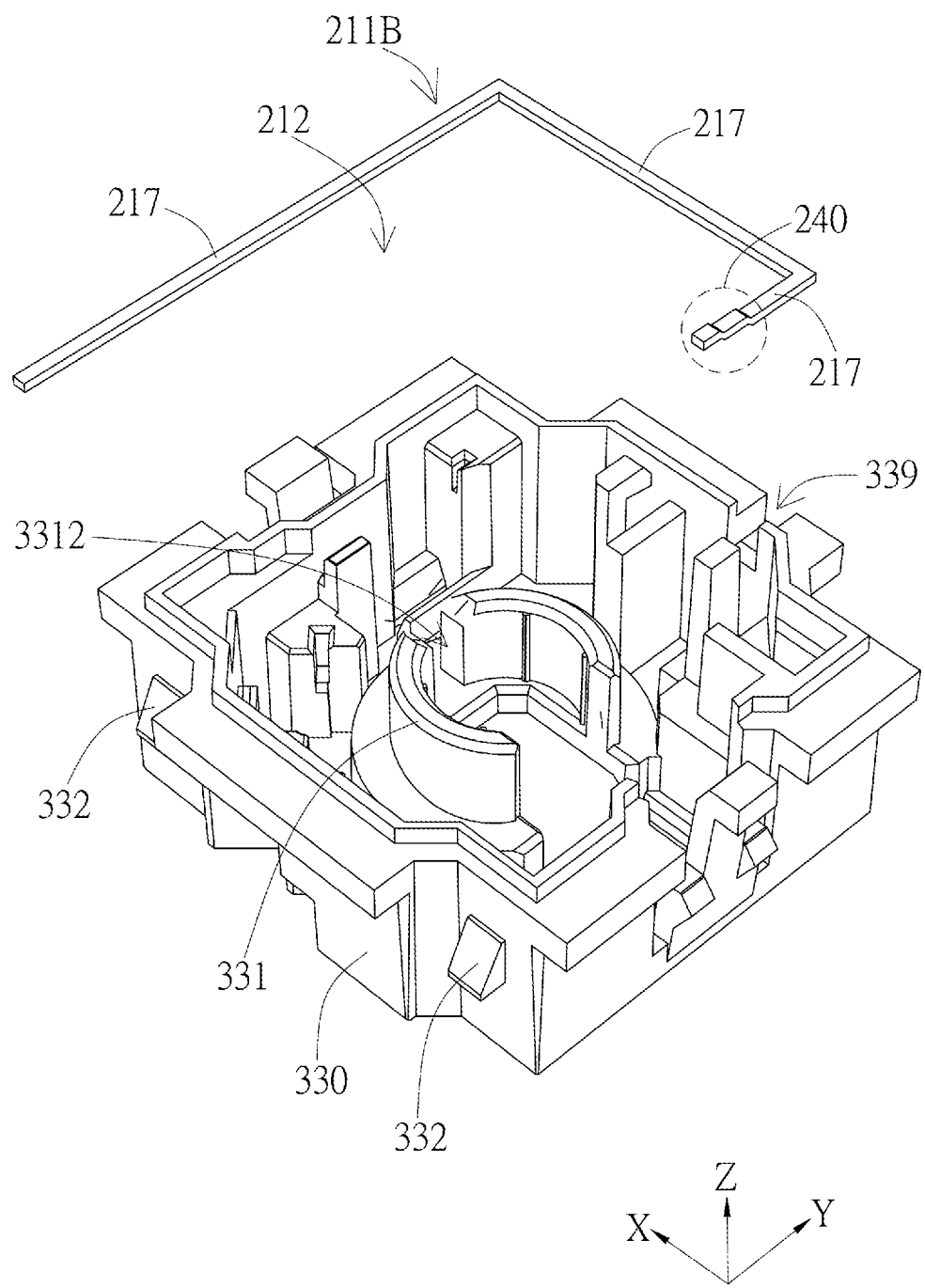
FIG. 15 is a schematic view of a variant embodiment of the adjustment unit of FIG. 14.

In the embodiments of FIGS. 12C, 13 and 14, the keyswitch 30C can provide different kinds of tactile feedback by controlling the moving distance of the adjustment unit 211 or 211A in the Z-axis direction, so that the vertical distance between the extending arm 364 or 314 and the cam portion 352 in the Z-axis direction is changed (i.e., the moving direction of the adjustment unit is the same as the deforming direction of the extending arm) to provide tactile feedback of different stroke points, but not limited thereto. FIG. 15 is a schematic view of a variant embodiment of the adjustment unit of FIG. 14. As shown in FIG. 15, the end portion of the adjustment unit 211B that serves as the adjustment portion 240, such as the free end of the sub-rib 217, preferably has a stepped structure arranged along the Y-axis direction. Specifically, the vertical distance between the adjustment portion 240 and the cam portion 352 can vary along the Y-axis direction. For example, the vertical distance becomes larger as the adjustment portion 240 is closer to the outer side of the lower casing 330. As such, by controlling the movement of the adjustment unit 211B in the Y-axis direction, the extending arm 364 selectively comes in contact with different portions of the stepped structure, so as to change a vertical distance between the extending arm and the cam portion and to provide tactile feedback of different stroke points. In other words, in this embodiment, the moving direction of the adjustment unit 211B is different from the deforming/shifting direction of the extending arm, and the two directions are preferably orthogonal to each other. In another embodiment, the stepped structure of FIG. 15 can be modified into an inclined structure. Similarly, by controlling the movement of the adjustment unit in the Y-axis direction, the extending arm selectively comes in contact with different portions of the inclined structure, so as to change a vertical distance between the extending arm and the cam portion and to provide tactile feedback of different stroke points.

Figure 16:
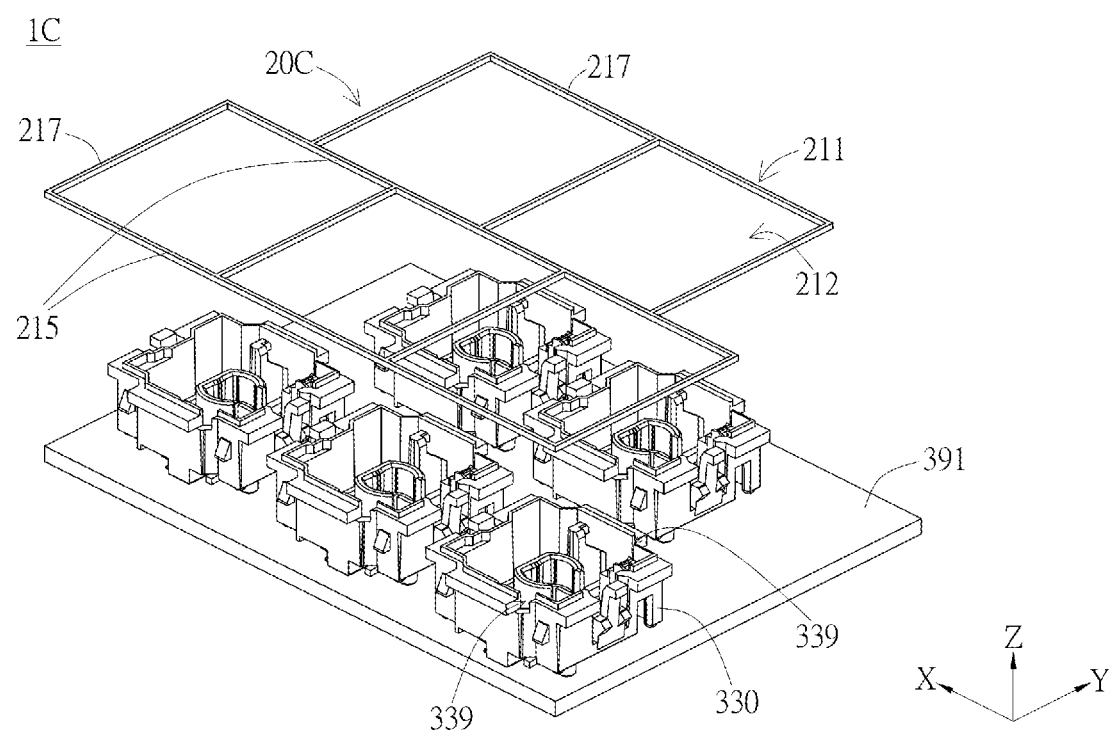
FIG. 16 is a schematic view showing the arrangement of the lower casing of the keyboard having the keyswitches of FIG. 12A and the adjustment mechanism.

FIG. 16 is a schematic view showing the arrangement of the lower casing 330 of the keyboard 10 having the keyswitches 30C of FIG. 12A and the adjustment mechanism 20C. As shown in FIG. 16, the plurality of adjustment units 211 are integrated into a single adjustment mechanism 20C, and the lower casing 330 of each keyswitches 30C is partially located in the opening (i.e., the second keyhole 212) surrounded by the plurality of sub-ribs 217 of a corresponding adjustment unit 211, so that the sub-tib 217 of the adjustment unit 211 that extends into the lower casing 330 serves as the adjustment portion to drive the extending arm to shift.

Figure 17:
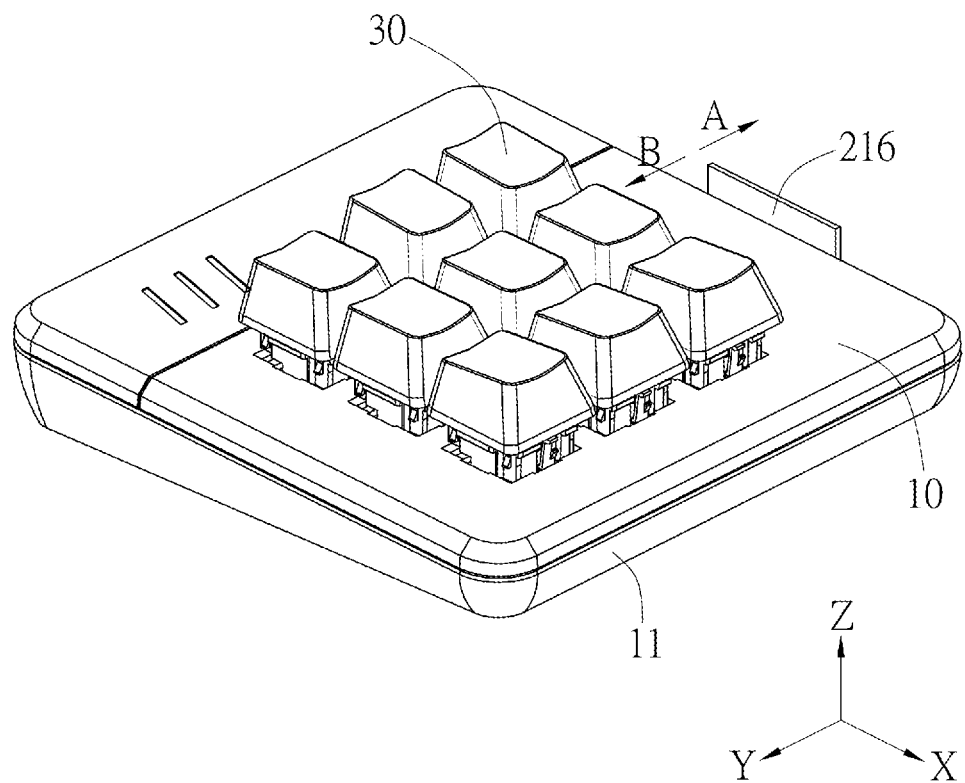
FIG. 17 is a schematic view of a variant embodiment of the keyboard of FIG. 1A.

In addition, in the embodiment of FIG. 1A, the operation portion 216 of the adjustment frame 210 extends through the opening 120 of the cover plate 10, and the operation button 40 capped thereon is located on the cover plate 10 (i.e., on the top side of the keyboard), but not limited thereto. In other embodiments, by modifying the location and design of the operation portion 216, the user may manipulate the movement of the adjustment mechanism from the lateral side or the bottom side of the keyboard. As shown in FIG. 17, in another embodiment, by exposing the operation portion 216 on the lateral side of the keyboard, the user may manipulate the movement of the adjustment mechanism from the lateral side of the keyboard.

Figure 18:
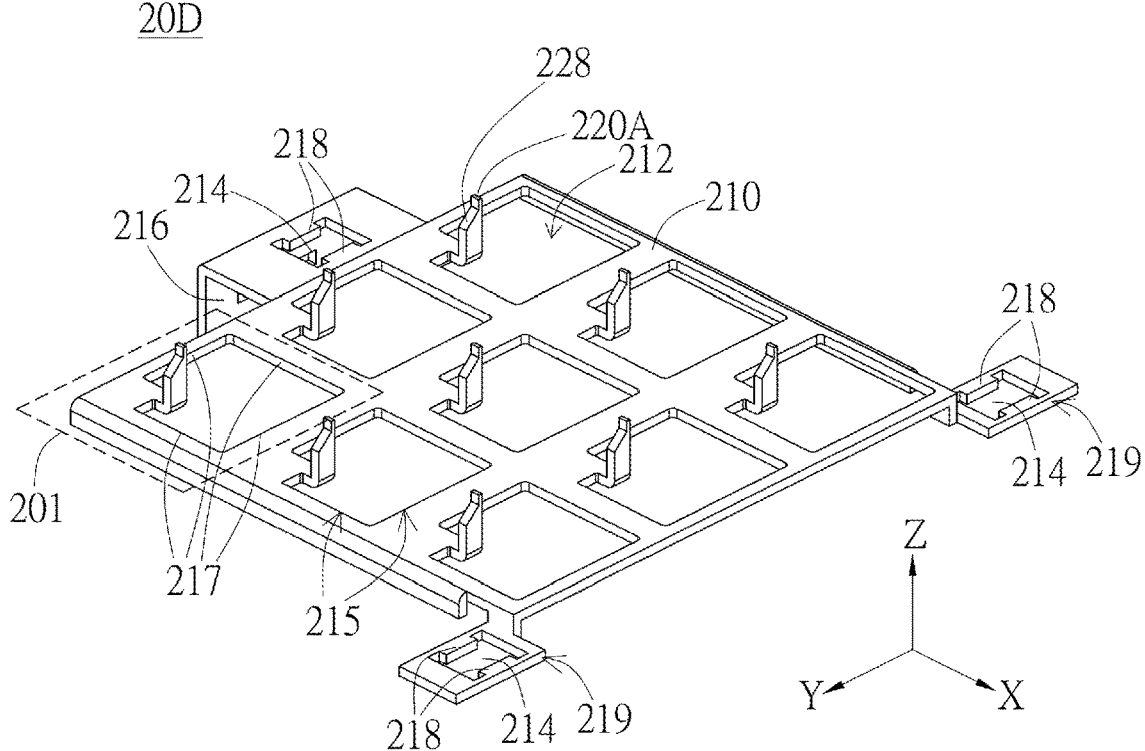
FIG. 18 is a schematic view of a variant embodiment of the adjustment mechanism of FIG. 6.

In the embodiments of FIGS. 1A to 11, the adjustment mechanism is positioned on the cover plate, but not limited thereto. In another embodiment, as shown in FIG. 18, by modifying the designs of the operation portion 216 and the positioning structure 219 of the adjustment mechanism 20D, the adjustment mechanism 20D can be positioned on other components of the keyboard, such as a baseplate. For example, the baseplate is preferably disposed below the adjustment mechanism 20D, and the baseplate can be the outer housing 11 of FIG. 1A, a support plate or a circuit board (such as the plate member 385 of FIG. 1B), and the baseplate may have a design similar to the stud portion 130 and the opening 120 of the cover plate 10. In this embodiment, the bending direction of the operation portion 216 is opposite to the bending direction of the adjustment portion 220A. As such, the adjustment frame 210 of the adjustment mechanism 20D can be movably positioned on the baseplate by engaging the positioning block 50 and the bolt 60 with the positioning structure 219. The operation portion 216 of the adjustment mechanism 20D can be exposed from the bottom of the keyboard (e.g. from the outer housing 11) and provided for the user to operate.

Figure 19:
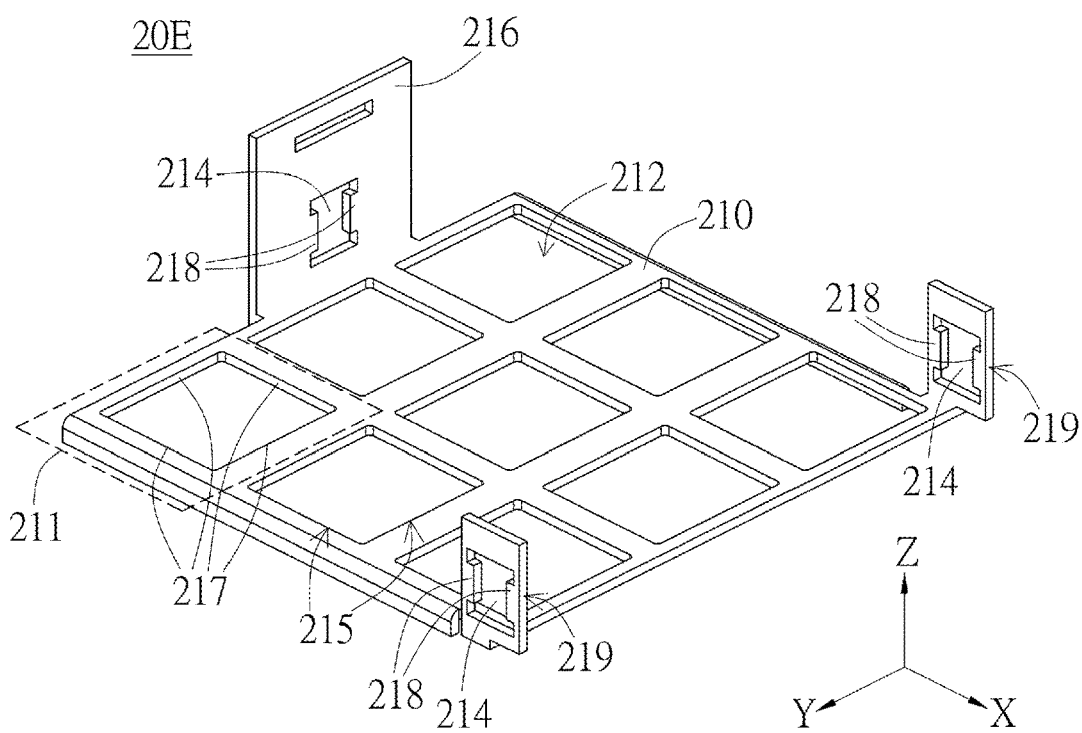
FIG. 19 is a schematic view of another variant embodiment of the adjustment mechanism of FIG. 6.

FIG. 19 is a schematic view of another variant embodiment of the adjustment mechanism. As shown in FIG. 19, the adjustment mechanism 20E includes an integral adjustment frame 210, which is constructed by integrating a plurality of adjustment units 211, such as nine adjustment units 211, and the positioning structure 219 is bent upward with respect to the adjustment frame 210. The plurality of sub-ribs 217 of the adjustment units 211 are connected to each other to form the plurality of ribs 215 and define a plurality of keyholes, such as second keyholes 212, and part of the plurality of ribs 215 (or sub-ribs 217) adjacent to the second keyholes 212 serve as the adjustment portions. In this embodiment, the positioning structure 219 is bent upward (or downward in other embodiments) with respect to the adjustment frame 210, so that the positioning hole 214 extends along the Z-axis direction. The hole width of the positioning hole 214 in the X-axis or Y-axis direction at two end portions along the Z-axis direction is larger than the hole width at the middle portion, so that the positioning hole 214 is an H-shaped opening, and the portion of the adjustment frame 210 defining the middle portion of the positioning hole 214 forms the wing portion 218, which extends along the X-axis direction or the Y-axis direction into the positioning hole 214. When the positioning block 50 is received in the positioning hole 214 of the adjustment frame 210, the wing portion 218 is clamped between the lower sub-block 510 and the upper sub-block 520 in the channel 540. For example, the wing portion 218 partially overlaps the lower sub-block 510 and the upper sub-block 520 along the Z-axis direction, so as to limit the movement of the adjustment frame 210 in the X-axis direction and the Y-axis direction, and allows the adjustment frame 210 to move relative to the positioning block 50 in the Z-axis direction. Similarly, the adjustment mechanism 20 can be positioned on a suitable component of the keyboard by means of the positioning block 50 and the bolt 60, so that the adjustment frame 210 can move relative to the cover plate 10 in the Z-axis direction by the clamping effect of the positioning block 50, so as to shift a portion of the tactile feedback member and to change the tactile feedback provided by the keyswitch, such as the tactile feedback of different stroke points.

In the above embodiments of the keyboard, each of the keyswitches in the keyboard is illustrated with one corresponding adjustment portion, so that the tactile feedback provided by all keyswitches in the same keyboard can be simultaneously adjusted by controlling the adjustment mechanism, but not limited thereto. In other embodiments, by optionally disposing the tactile feedback members in selected keyswitches, some of the keyswitches in the keyboard (e.g. W, A, S, D keyswitches) may have the function of adjusting tactile feedback while the rest keyswitches do not have the function of adjusting tactile feedback, and the user can still be satisfied in different operation situations, such as gaming. In the case that only part of the keyswitches requires the function of tactile feedback adjustment, the positioning design of FIG. 18 is preferably adopted, so that the adjustment frame can be disposed corresponding to those keyswitches, and the operation portion is exposed from the bottom area of the keyboard adjacent to those keyswitches, without deliberately considering the design of the outer appearance of the cover plate. Moreover, in the above embodiments of keyboard, each keyswitch preferably has the same tactile feedback member to provide substantially the same tactile feedback, but not limited thereto. According to practical applications, some of the keyswitches in the keyboard may have different tactile feedback members to provide different kinds of tactile feedback.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A keyboard comprising:
a plurality of adjustable keyswitches, each comprising a casing, a restoring member, a plunger and a tactile feedback member, the tactile feedback member being positioned within the casing to selectively interfere a moving path of a cam portion of the plunger, the restoring member providing a restoring force to drive the plunger towards a non-pressed position; and
an adjustment frame, including a plurality of sub-ribs defining a plurality of second keyholes aligned side by side, each of the second keyholes at least partially overlapping a vertical projection of a corresponding one of the keyswitches respectively, wherein a plurality of adjustment portions extend from the adjustment frame, and each of the adjustment portions is located proximate to a corresponding one of the second keyholes to selectively interfere the tactile feedback member of a corresponding one of the keyswitches;
wherein when the adjustment frame moves relative to the plurality of keyswitches, the adjustment portion drives a portion of the tactile feedback member to move relative to the cam portion and changes tactile feedback of each of the key switches.

2. The keyboard of claim 1, wherein the tactile feedback member comprises a positioning portion positioned on the casing and an extending arm extending corresponding to the cam portion.

3. The keyboard of claim 2, wherein the adjustment portion extends from the sub-rib toward the second keyhole and is bent upward from the adjustment frame to extend into the casing corresponding to the extending arm.

4. The keyboard of claim 3, wherein the adjustment portion has a first inclined surface; when the adjustment frame moves relative to the plurality of keyswitches, the extending arm moves along the first inclined surface to change a horizontal distance and a vertical distance between the extending arm and the cam portion.

5. The keyboard of claim 3, wherein the adjustment portion has a first inclined surface; the casing has a second inclined surface; when the adjustment frame moves relative to the plurality of keyswitches, the extending arm selectively comes in contact with the first inclined surface or the second inclined surface; a vertical distance between the first inclined surface and the cam portion is different from a vertical distance between the second inclined surface and the cam portion.

6. The keyboard of claim 2, wherein the adjustment portion extends from the sub-rib horizontally toward the second keyhole to correspond to the positioning portion.

7. The keyboard of claim 2, wherein part of the plurality of sub-ribs adjacent to the second keyholes serve as the adjustment portions.

8. A keyswitch, comprising:
a lower casing;
an upper casing combined with the lower casing;
a plunger coupling with the upper casing to be movable relative to the lower casing, the plunger having a cam portion;
a restoring member disposed between the lower casing and the plunger to provide a restoring force to move the plunger away from the lower casing;
a tactile feedback member comprising a positioning portion positioned on the lower casing and an extending arm extending across a moving path of the cam portion; and
an adjustment unit disposed corresponding to the tactile feedback member, the adjustment unit comprising a plurality of sub-ribs to define an opening for receiving at least a portion of the lower casing therein,
wherein the adjustment unit is movable relative to the lower casing to move a portion of the tactile feedback member, so as to change a pressing force required for the cam portion to pass the extending arm when the plunger moves toward the lower casing.

9. The keyswitch of claim 8, wherein the adjustment unit comprises an adjustment portion extending toward the opening and bent upward from the adjustment unit to extend into the lower casing corresponding to the extending arm.

10. The keyswitch of claim 9, wherein the adjustment portion has a first inclined surface; when the adjustment unit moves relative to the lower casing, the extending arm moves along the first inclined surface to change a horizontal distance and a vertical distance between the extending arm and the cam portion.

11. The keyswitch of claim 9, wherein the adjustment portion has a first inclined surface; the lower casing has a second inclined surface; when the adjustment unit moves relative to the lower casing, the extending arm selectively comes in contact with the first inclined surface or the second inclined surface; a vertical distance between the first inclined surface and the cam portion is different from a vertical distance between the second inclined surface and the cam portion.

12. The keyswitch of claim 8, wherein one of the plurality of sub-ribs comprises a stepped structure or an inclined structure; when the adjustment unit moves relative to the lower casing, the extending arm selectively comes in contact with different portions of the stepped structure or the inclined structure, so as to change a vertical distance between the extending arm and the cam portion.

13. The keyswitch of claim 8, wherein the adjustment unit comprises an adjustment portion extending horizontally toward the opening to correspond to the positioning portion.

14. An adjustment mechanism for adjusting tactile feedback of a plurality of adjustable keyswitches of a keyboard, each of the keyswitches comprising a casing with a tactile feedback member and a moveable and restorable plunger accommodated therein, the tactile feedback member including a resilient extending arm, the adjustment mechanism comprising:
   an adjustment frame comprising a plurality of sub-ribs to define a plurality of openings aligned side by side, each of the openings overlapping a vertical projection of the casing of each of the keyswitches; and
   a plurality of adjustment portions respectively disposed adjacent to the openings, each of the openings at least partially surrounding two adjacent sides of the casing of a corresponding one of the keyswitches,
   wherein when the adjustment frame moves relative to the keyswitches, each of the adjustment portions drives a portion of the tactile feedback member to provide or change an additional resilient force applied to the plunger of each of the keyswitches via the extending arm of the tactile feedback member.

15. The adjustment mechanism of claim 14, wherein the adjustment portion extends from the sub-rib toward the opening and is bent upward from the adjustment frame.

16. The adjustment mechanism of claim 15, wherein the adjustment portion has an inclined surface; when the adjustment frame moves relative to the keyswitches, the tactile feedback member partially moves along the inclined surface.

17. The adjustment mechanism of claim 14, wherein the adjustment portion extends from the sub-rib horizontally toward the opening.

18. The adjustment mechanism of claim 14, wherein part of the sub-ribs adjacent to the openings serves as the adjustment portions.

19. The adjustment mechanism of claim 14, further comprising an operation portion bent with respect to the adjustment frame.

20. The adjustment mechanism of claim 14, wherein the adjustment frame further comprises a positioning structure comprising a positioning hole and at least one wing portion; the wing portion protrudes toward the positioning hole.

21. A keyboard, comprising:
   a plurality of adjustable keyswitches, each of the keyswitches comprising a casing accommodated a plunger, a restoring member and a tactile feedback member therein, the tactile feedback member including a resilient extending arm, the restoring member providing a restoring force to drive the plunger towards a direction of a non-pressed position; and
   an adjustment frame, comprising a plurality pairs of adjustment portions and second keyholes proximate to each other, the second keyholes being defined side by side by a plurality of ribs, the second keyholes respectively overlapping a vertical projection of the casing and at least partially surrounding the casing of each of the keyswitches;
   wherein when the adjustment frame moves relative to a plane defined by the keyswitches, each of the adjustment portions drives a portion of the tactile feedback member to provide or change an additional resilient force applied to the plunger via the extending arm of the tactile feedback member of each of the keyswitches, and tactile feedback of all the corresponding adjustable keyswitches are changed at the same time accordingly.

22. The keyboard of claim 21, further comprising a cover plate having a plurality of first keyholes, each surrounding the casing of a corresponding one of the keyswitches and overlapping a corresponding one of the second keyholes respectively.

23. The keyboard of claim 21, further comprising:
   a switch layer, having a plurality of switches underneath the plunger of each of the keyswitches, the adjustment frame being movably disposed between the keyswitches and the switch layer; and
   a plurality of resilient members, each disposed between the plunger and the switch layer and passing through a corresponding one of the second keyholes;
   wherein in response to a downward movement of the plunger, the resilient member is depressed to trigger a corresponding one of the switch on the switch layer.

* * * * *